(12) United States Patent
Ding et al.

(10) Patent No.: US 8,934,941 B2
(45) Date of Patent: Jan. 13, 2015

(54) CHANNEL RECONSTRUCTION METHOD, BASE STATION AND USER EQUIPMENT

(75) Inventors: Ming Ding, Shanghai (CN); Renmao Liu, Shanghai (CN); Yingyu Zhang, Shanghai (CN); Lei Huang, Shanghai (CN); Chen Chen, Shanghai (CN)

(73) Assignee: Sharp Kabushiki Kaisha, Osaka (JP)

( * ) Notice: Subject to any disclaimer, the term of this patent is extended or adjusted under 35 U.S.C. 154(b) by 758 days.

(21) Appl. No.: 13/255,348

(22) PCT Filed: Mar. 8, 2010

(86) PCT No.: PCT/JP2010/054272
§ 371 (c)(1),
(2), (4) Date: Sep. 8, 2011

(87) PCT Pub. No.: WO2010/104190
PCT Pub. Date: Sep. 16, 2010

(65) Prior Publication Data
US 2012/0004014 A1   Jan. 5, 2012

(30) Foreign Application Priority Data
Mar. 12, 2009 (CN) .......................... 2009 1 0126547

(51) Int. Cl.
*H04M 1/00* (2006.01)
*H04B 7/02* (2006.01)
(Continued)

(52) U.S. Cl.
CPC .............. *H04B 7/024* (2013.01); *H04B 7/0434* (2013.01); *H04B 7/0452* (2013.01); *H04B 7/0617* (2013.01); *H04B 7/0619* (2013.01); *H04B 7/0621* (2013.01)
USPC ...................................... 455/562.1; 455/561

(58) Field of Classification Search
USPC ................................ 455/562.1, 561; 375/267
See application file for complete search history.

(56) References Cited

U.S. PATENT DOCUMENTS

2007/0041457 A1 *   2/2007   Kadous et al. ................ 375/260
2008/0025267 A1 *   1/2008   Wei et al. ...................... 370/337
(Continued)

FOREIGN PATENT DOCUMENTS

KR  10-2007-0096883 A  10/2007
WO  2007/111449 A1    10/2007

OTHER PUBLICATIONS

3GPP R1-082847,"On Consideration for CoMP in LTE-A", 3GPP TSG-RAN WG1 #54, Jeju, Korea, Aug. 18-Aug. 22, 2008.
(Continued)

*Primary Examiner* — Lewis West
(74) *Attorney, Agent, or Firm* — Birch, Stewart, Kolasch & Birch, LLP

(57) ABSTRACT

The present invention discloses a channel reconstruction method for a downlink multi-antenna-multi-base-station with inconsistent antenna configuration. Firstly, a serving base station configures a user equipment. If antenna configuration of the multi-antenna-multi-base-station system is inconsistent, virtual antennas are introduced to a base station with fewer antennas in the system. A user equipment selects and feeds back indices of the virtual antennas and reconstructs channels of the multi-antenna-multi-base-station system to generate a consistent antenna configuration. Finally, the multi-antenna-multi-base-station system transmits a signal to the user equipment by adopting a transmission pre-processing scheme of the consistent antenna configuration. The present invention provides also a serving base station, a cooperative base station and a user equipment for realizing the channel reconstruction method. The present invention has advantages of large application range, simple implementation and better performance.

13 Claims, 9 Drawing Sheets

(51) Int. Cl.
*H04B 7/04* (2006.01)
*H04B 7/06* (2006.01)

(56) References Cited

U.S. PATENT DOCUMENTS

2008/0144733 A1* 6/2008 ElGamal et al. ............... 375/267
2009/0207822 A1* 8/2009 Kim et al. ...................... 370/338
2009/0215480 A1* 8/2009 Kim et al. ...................... 455/501

OTHER PUBLICATIONS

3GPP R1-090585, "Joint Processing Downlink COMP Precoding Support ", 3GPP TSG RAN WG1 #56, Athens, Greece, Feb. 9-13, 2009.
R1-090598, "An issue on multi-cell antenna allocation for joint approaches", 3GPP TSG RAN WG1 #56, Athens, Greece, Feb. 9-13, 2009, pp. 1-5.
R1-090696, "Considerations on precoding scheme for DL joint processing CoMP", 3GPP TSG RAN WG1 Meeting #56, Athens, Greece, Feb. 9-13, 2009, pp. 1-8.
R1-091133, "Further Considerations on MBSFN Precoding for DL CoMP", 3GPP TSG RAN WG1 Meeting #56bis, Seoul, Korea, Mar. 23-27, 2009, pp. 1-12.
R1-092407, "Precoding-Related Issues on 8Tx Downlink SU-MIMO", 3GPP TSG RAN WG1 57bis, Los Angeles, USA, Jun. 29-Jul. 3, 2009, pp. 1-6.
R1-093352, "Concatenated codebook for DL CoMP in LTE-A", 3GPP TSG RAN WG1 #58, Shenzhen, China, Aug. 24-28, 2009, pp. 1-7.
TS 36.213 V8.3.0, "Envolved Universal Terrestrial Radio Access (E-UTRA); Physical layer procedures (Release 8)", 2008.5, May 2008.

* cited by examiner

CHANNEL RECONSTRUCTION METHOD, BASE STATION AND USER EQUIPMENT

TECHNICAL FIELD

The present invention relates generally to communication technique fields. More specifically, the present invention relates to a channel reconstruction method for downlink multi-antenna-multi-base-stations with an inconsistent antenna configuration and a serving base station, cooperative base station and user equipment for implementing the channel reconstruction method. According to the present invention, channel reconstruction is adopted for inconsistent antenna configuration in wireless communication system and downlink data transmission rate may be improved through cooperative communication of multi-antenna-multi-base-stations.

BACKGROUND ART

Multi-antenna (MIMO: Multiple in Multiple out) wireless transmission technology configures multiple antennas at transmit side and receive side and makes use of space resources in the wireless transmission so as to obtain spatial multiplexing gain and space diversity gain. Information theory research shows that MIMO system capacity linearly increases with the minimum value of the number of transmit antennas and the number of receive antennas. A schematic drawing of MIMO system is illustrated in FIG. 1. As shown in FIG. 1, multiple antennas at the transmit side and receive side constitute multi-antenna wireless channels including space-domain information. Precoding technology is currently one of main technologies for improving data rate by using the space-domain information and pre-processes transmit signal by using channel state information. Precoder is actually a multi-mode beamforming device which matches the transmit signal to channels at the transmit-receive sides. Basic principle of the precoder is separating the transmit signal into a plurality of layers which are orthogonal to each other, making the layers to obtain relatively large gain after passing through channels and maintaining independent orthogonality. Orthogonal and independent data layers transferred between the receive-transmit sides may be M layers at most, which is the minimum number of antennas configured at the both receive side and transmit side. In addition, OFDM (Orthogonal Frequency Division Multiplexing) technology has strong anti-fading capability and high frequency efficiency and is suitable for high speed data transmission in a multi-path scenario and fading scenario. MIMO-OFDM technology which combines MIMO and OFDM technologies has become to a core technique of new generation mobile communication.

For example, 3GPP (the 3rd Generation Partnership Project) organization is an international organization in mobile communication fields and plays an important role in standardization work of 3G cellular communication technologies. 3GPP organization started to design EUTRA (Evolved Universal Mobile Telecommunications System Terrestrial Radio Access) and EUTRAN (Evolved Universal Mobile Telecommunications System Terrestrial Radio Access Network) which is also called LTE (Long Term Evolution) project from the latter half in 2004. Downlinks of LTE system adopt the MIMO-OFDM technology. From 3GPP organization Meeting in April 2008 in Shenzhen, China, standardization work of 4G cellular communication system (now called LTE-A system) began to be discussed. During the meeting, a concept "multi-antenna-multi-base-station cooperation" has been widely considered and supported and its basic principle is to provide communication service to one user or more users simultaneously by using a plurality of base stations so as to improve data transmission rate of cell edge users. The precoding scheme in the multi-antenna-multi-base-station cooperation is a key technique for implementing this concept.

However, antenna configurations of multiple cooperative base stations are usually different, resulting that the precoding scheme will face implementation limits and is difficult to realize. In some technical documents, there are three proposals for the inconsistent antenna configuration.

(1) Global Precoding Method

A serving base station and a cooperative base station perform precoding in a centralized manner, i.e., cascading channels from the serving base station and the cooperative base station to a user equipment to form a global channel with large dimensions, and then cascading precoding matrixes of the serving base station and the cooperative base station to form a precoding codeword with a considerable length so as to match the global channel. The centralizedly precoded signal is subject to the global channel and the resulted signal and noise form received signal at the user equipment. The received signal may be expressed with an equation:

$$y = [H_1 H_2 \ldots H_N] W x + n.$$

In the equation, y is the received signal, x is transmit data, n is noise, N is the total number of the serving base stations and the cooperative base stations, $[H_1 H_2 \ldots H_N]$ is the global channel from the serving base station and the cooperative base station to the user equipment and W is a precoding matrix for matching the global channel. The core theory of the global precoding method is that the inconsistent antenna configuration does not affect the channel cascading and thus this method is applicable to any antenna scenario. FIG. 2 is a schematic drawing illustrating that three base stations adopt this method. Advantages of this method are large application range and better performance and disadvantages are high complexity of the centralized precoding and large signaling overhead. See Non-Patent Document 1: 3GPP, R1-090585, "Joint Processing Coordinated Multi-point Transmission for LTE-A Downlink", Texas Instruments.

(2) Distributed Layered Precoding Method

In order to reduce complexity of the above method (1), the multi-antenna-multi-base-station system is considered as a multi-antenna independent base station. Upon that, independent precoding may be performed and independent data layer may be transferred for a single base station, however, orthogonality between the data layers needs to be guaranteed such that the user equipment is able to separate and analyze a plurality of independent data layers. The precoded signal of the distributed-independent-data-layer is channel weighted and combined and the resulted signal and noise form received signal at the user equipment. The received signal may be expressed with an equation:

$$y = [H_1 \quad H_2 \quad \ldots \quad H_N] \begin{bmatrix} V_1 & 0 & 0 & 0 \\ 0 & V_2 & 0 & 0 \\ 0 & 0 & \ddots & 0 \\ 0 & 0 & 0 & V_N \end{bmatrix} x + n$$

In the equation, y is the received signal, x is transmit data, n is noise, N is the total number of the serving base stations and the cooperative base stations, $H_1, H_2, \ldots, H_N$ is a channel matrix from the serving base station and the cooperative base station to the user equipment and $$\begin{bmatrix} V_1 & 0 & 0 & 0 \\ 0 & V_2 & 0 & 0 \\ 0 & 0 & \ddots & 0 \\ 0 & 0 & 0 & V_N \end{bmatrix}$$

is a precoding matrix of the distributed independent data layer. The core theory of this method is that independent data layers are born on $V_1, V_2, \ldots, V_N$ respectively, i.e., N base stations transmit independent data layers, and the signal is separated and solved at the user equipment side. The basic idea of this method is to sacrifice cooperative level of multiple stations and solve the inconsistent antenna configuration problem through the independent transmission. FIG. 3 is a schematic drawing illustrating that three base stations adopt this method. An advantage of this method is large application range and disadvantages are that orthogonality between independent data layers is difficult be realized completely and cooperation level of base stations is low, resulting in low system capacity. See Non-Patent Document 1: 3GPP, R1-090585, "Joint Processing Coordinated Multi-point Transmission for LTE-A Downlink", Texas Instruments.

(3) Antenna Selection Method

This method selects a few antennas from the serving base station and cooperative base station, respectively, to constitute a distributed antenna system, and then uses a single precoding matrix to match channels of the distributed antenna system. From view of the user equipment, channel matrix from the serving base station and cooperative base station to the user equipment is subject to selection and simplified as a virtual channel, i.e., a distributed antenna channel, and then a uniform precoding matrix is used to match the distributed antenna channel, which may be expressed with an equation: $y = \tilde{H} Wx + n$.

In the equation, y is the received signal, x is transmit data, n is noise, $\tilde{H}$ is a distributed antenna channel matrix after antenna selection and W is the precoding matrix used to match the distributed antenna channel. The core theory of this method is to shut down a few base station antennas and reduce channel dimension between multi-base-stations and the user equipment so as to reconstruct a simple channel and perform cooperative communication. FIG. 4 is a schematic drawing illustrating that three base stations adopt this method. An advantage of this method is that implementation is simple and disadvantages are that signaling overhead for antenna selection is large and insufficient antenna diversity will cause worse performance. See Non-Patent Document 2: 3GPP, R1-082847, "On Consideration for CoMP in LTE-A", ZTE.

In general, the global precoding method (1) adopts the centralized precoding, which obtains better performance but its complexity is high, feedback overhead is large and it is difficult to be realized. The distributed layered precoding method (2) reduces the complexity of implementation, but cooperation level of the base stations is low, system performance is worse and the feedback overhead is still large. Comparatively, the antenna selection method (3) is simplest to be implemented, but its performance is not good.

SUMMARY OF INVENTION

The present invention aims to overcome deficiencies of high complexity or bad performance in prior arts and provides a channel reconstruction method for a downlink multi-antenna-multi-base-station system with inconsistent antenna configuration. Firstly, a serving base station configures a user equipment. If antenna configuration of the multi-antenna-multi-base-station system is inconsistent, virtual antennas are introduced to a base station with fewer antennas in the system. A user equipment selects and feeds back indices of the virtual antennas and reconstructs channels of the multi-antenna-multi-base-station system to generate a consistent antenna configuration. Finally, the multi-antenna-multi-base-station system transmits signal to the user equipment by adopting a transmission pre-processing scheme of the consistent antenna configuration. The present invention provides also a serving base station, a cooperative base station and a user equipment for realizing the channel reconstruction method. The present invention has advantages of large application range, simple implementation and better performance.

According to a first aspect of the present invention, there is provided a channel reconstruction method. The method comprises configuring, by a serving base station, for a user equipment and generating configuration information for the user equipment, the configuration information including identification information of respective cooperative base stations and respective numbers of antennas configured by the serving base station and respective cooperative base stations; introducing, by the user equipment, virtual antennas to a base station with less number of configured antennas, when the serving base station and respective cooperative base stations configure different number of antennas for the user equipment; and reconstructing, by the user equipment, downlink channels between (i) itself and (ii) the serving base station and respective cooperative base stations, and forming downlink channels of antennas in which the serving base station and respective cooperative base stations could configure consistent number of antennas for the user equipment.

Preferably, the identification information of respective cooperative base stations is cell identifiers (cell IDs) of respective cooperative base stations.

Preferably, the user equipment introducing the virtual antennas to the base station with less number of configured antennas comprises adding dummy antennas as the virtual antennas to the base station with less number of configured antennas, i.e., adding dummy antennas with null power, such that the serving base station and respective cooperative base stations could configure consistent number of antennas for the user equipment. More preferably, the downlink channel reconstruction comprises setting channel elements corresponding to the dummy antennas to 0 according to the indices of the dummy antennas, and performing power correction for channel elements at other positions such that the introduction of the dummy antennas will not change the total power of the base station.

Preferably, the user equipment introducing the virtual antennas to the base station with less number of configured antennas comprises adding clonal antennas as the virtual antennas to the base station with less number of configured antennas, i.e., copying and extending real antennas of the base station with less number of configured antennas, such that the serving base station and respective cooperative base stations could configure consistent number of antennas for the user equipment. More preferably, the real antennas are copied and extended according to a sequential number of the real antennas. More preferably, downlink channel reconstruction comprises copying channel element values corresponding to the real antennas to channel element positions corresponding to the clonal antennas according to the indices of the clonal antennas.

Preferably, the channel reconstruction method comprises selecting and feeding back, by the user equipment, indices of the introduced virtual antennas to the serving base station.

More preferably, the user equipment feeds back selected indices of the virtual antennas to respective cooperative base stations.

Preferably, the user equipment, the serving base station and respective cooperative base station pre-save a mapping table related to the indices of the introduced virtual antennas and the user equipment introduces the virtual antennas to the base station with less number of antennas according to the mapping table.

Preferably, the channel reconstruction method further comprises generating a transmission pre-processing scheme, by the serving base station and respective base stations, according to an introduced virtual antenna configuration, i.e., indices of virtual antennas, and transmitting signal to the user equipment. More preferably, the serving base station and respective base stations obtain a precoding codebook matched to the number of antennas according to the introduced virtual antenna configuration.

Preferably, the user equipment is applicable to a multi-antenna-multi-base-station system.

According to a second aspect of the present invention, there is provided a base station, which comprises a configuration unit configuring a user equipment and generating configuration information for the user equipment, which includes at least identification information of respective cooperative base stations and respective numbers of antennas configured by base station and cooperative base station for the user equipment; a transmit unit notifying the configuration information to the user equipment; and a transmission pre-processing scheme generating unit generating a transmission pre-processing scheme according to introduced virtual antenna configuration and transmitting signal to the user equipment.

Preferably, the identification information of respective cooperative base stations is cell identifiers (cell IDs) of respective cooperative base stations.

Preferably, the base station further comprises a receive unit receiving an index of the introduced virtual antenna from the user equipment.

Preferably, the base station further comprises a storage unit saving a mapping table related to the index of the introduced virtual antenna.

Preferably, the transmission pre-processing scheme generating unit obtains a precoding codebook matched to the number of antennas according to the introduced virtual antenna configuration.

Preferably, the base station is applicable to a multi-antenna-multi-base-station system and used as a serving base station.

According to a third aspect of the present invention, there is provided a base station, which comprises a receive unit receiving, from a serving base station in a cooperative communication that the base station participated in, configuration information configured by the serving base station for a user equipment, the configuration information including at least identification information of respective cooperative base stations and respective numbers of antennas configured by the serving base station and the cooperative base station for the user equipment; and a transmission pre-processing scheme generating unit generating a transmission pre-processing scheme according to introduced virtual antenna configuration and transmitting signal to the user equipment.

Preferably, the base station further comprises a transmit unit notifying the configuration information to the user equipment.

Preferably, the identification information of respective cooperative base stations is cell identifiers (cell IDs) of respective cooperative base stations.

Preferably, the receive unit further receives an index of the introduced virtual antenna from the user equipment.

Preferably, the base station further comprises a storage unit saving a mapping table related to the index of the introduced virtual antenna.

Preferably, the transmission pre-processing scheme generating unit obtains a precoding codebook matched to the number of antennas according to the introduced virtual antenna configuration.

Preferably, the base station is applicable to a multi-antenna-multi-base-station system and used as a serving base station.

According to a fourth aspect of the present invention, there is provided a user equipment. The user equipment comprises a receive unit receiving configuration information of the user equipment from a base station, the configuration information including identification information of respective cooperative base stations and respective numbers of antennas configured by a serving base station and respective cooperative base stations for the user equipment; a virtual antenna introduction unit introducing virtual antennas to a base station with less number of configured antennas, when the serving base station and respective cooperative base stations configure different number of antennas for the user equipment; and a downlink channel reconstruction unit reconstructing downlink channels between (i) the user equipment and (ii) the serving base station and respective cooperative base stations, and forming downlink channels of antennas in which the serving base station and respective cooperative base stations could configure consistent number of antennas for the user equipment.

Preferably, the identification information of respective cooperative base stations is cell identifiers (cell IDs) of respective cooperative base stations.

Preferably, the virtual antenna introduction unit adds dummy antennas as the virtual antennas to the base station with less number of configured antennas, i.e., adding dummy antennas with null power, such that the serving base station and respective cooperative base stations could configure consistent number of antennas for the user equipment. More preferably, the downlink channel reconstruction unit sets channel elements corresponding to the dummy antennas to 0 according to the indices of the dummy antennas, and performs power correction for channel elements at other positions such that the introduction of the dummy antennas will not change the total power of the base station.

Preferably, the virtual antenna introduction unit adds clonal antennas as the virtual antennas to the base station with less number of configured antennas, i.e., copying and extending real antennas of the base station with less number of configured antennas, such that the serving base station and respective cooperative base stations could configure consistent number of antennas for the user equipment. Preferably, the real antennas are copied and extended according to sequential number of the real antennas. More preferably, the downlink channel reconstruction unit copies channel element values corresponding to the real antennas to channel element positions corresponding to the clonal antennas according to the indices of the clonal antennas.

Preferably, the user equipment further comprises a virtual antenna index selection unit selecting indices of the introduced virtual antennas; and a transmit antenna feeding back selected indices of the virtual antennas to the serving base station. More preferably, the transmit unit feeds back selected indices of the virtual antennas to respective cooperative base stations.

Preferably, the user equipment further comprises a storage unit saving a mapping table related to the indices of the introduced virtual antennas, wherein the virtual antenna introduction unit introduces the virtual antennas to the base station with less number of antennas according to the mapping table.

Preferably, the user equipment is applicable to a multi-antenna-multi-base-station system.

The present invention has similarity to the above antenna selection method (3) in some level, which also pre-processes the base station antennas. However, the present invention obtains a channel reconstruction scheme for the downlink multi-antenna-multi-base-stations with an inconsistent antenna configuration, which obtains better performance by adding a few virtual antennas without increasing the complexity.

BRIEF DESCRIPTION OF THE DRAWINGS

The foregoing and other objectives, features, and advantages of the invention will be more readily understood upon consideration of the following detailed description of the invention, taken in conjunction with the accompanying drawings.

DESCRIPTION OF EMBODIMENTS

Preferred embodiments will be explained by referring to the accompanying drawings. Unnecessary parts and functions for the present invention will be omitted for brevity so as to avoid confusion in understanding.

In order to clearly clarify implementing steps of the present invention, embodiments applicable to downlink LTE cellular communication system according to the present invention are presented in the following descriptions. It is to be noted that the present invention is not limited to the following descriptions, but is also applicable to other communication system such as LTE-A system in the near future.

Figure 1:
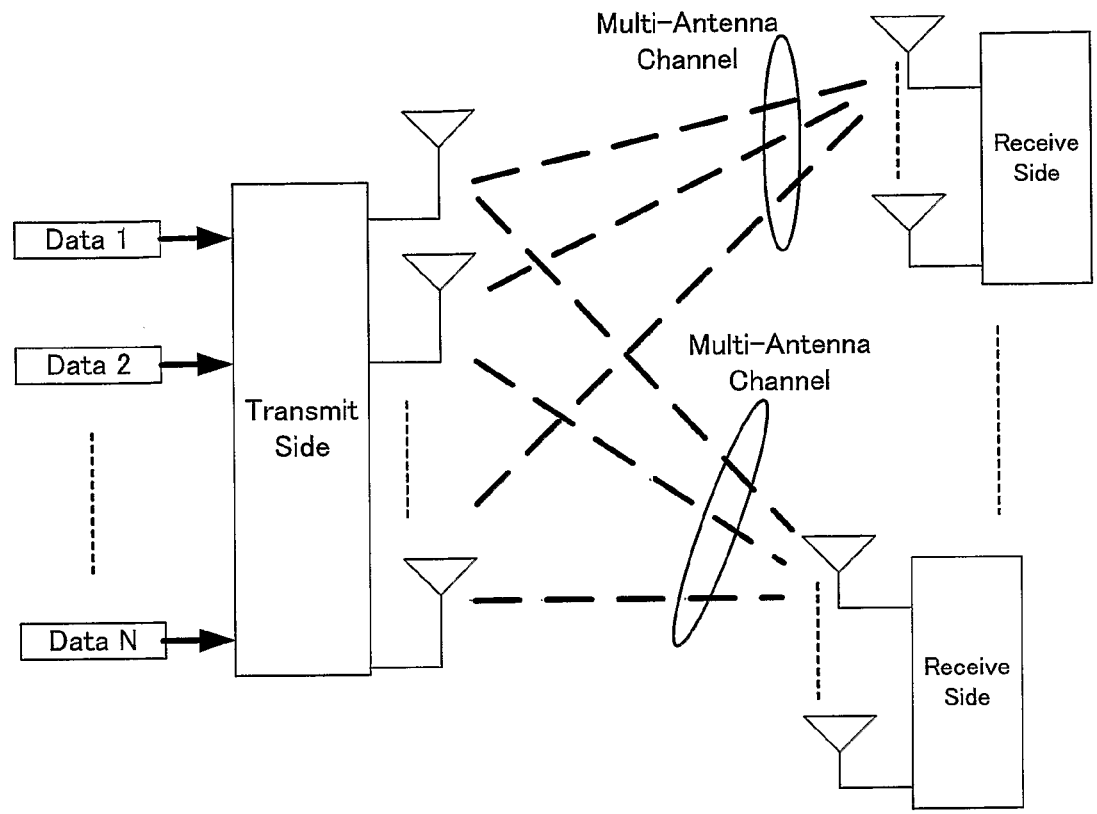
FIG. 1 is a schematic diagram illustrating a MIMO system.
Figure 2:
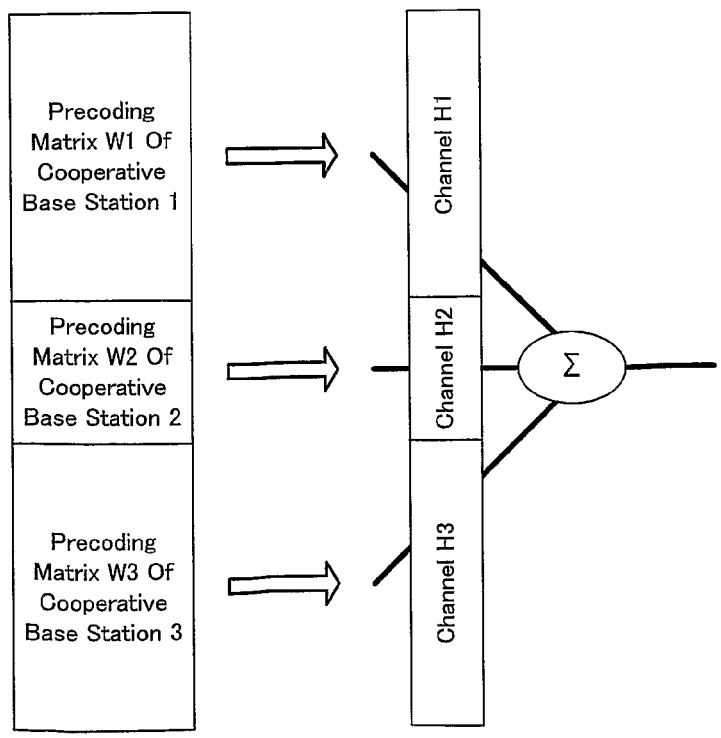
FIG. 2 is a schematic drawing illustrating three base stations cooperatively adopting a global precoding method (1)
Figure 3:
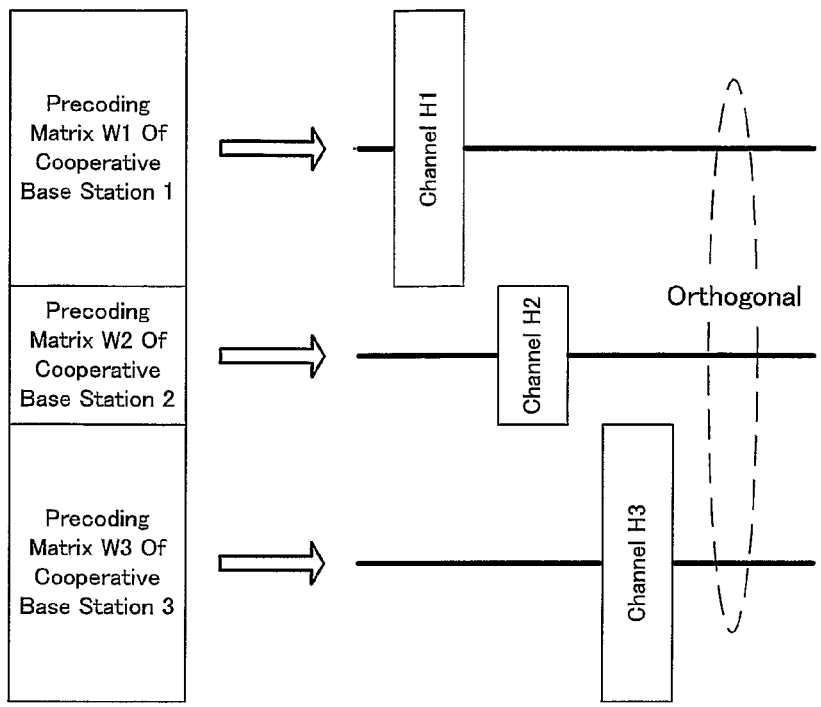
FIG. 3 is a schematic drawing illustrating three base stations cooperatively adopting a distributed layered precoding method (2)
Figure 4:
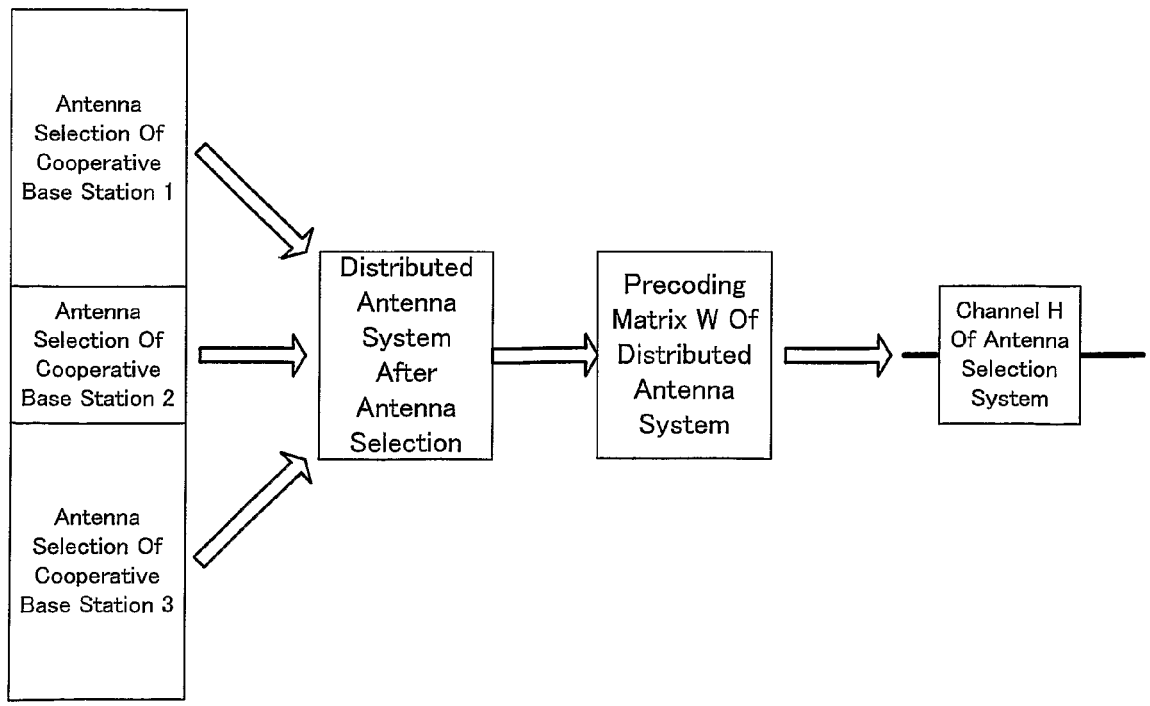
FIG. 4 is a schematic drawing illustrating three base stations cooperatively adopting an antenna selection method (3)
Figure 5:
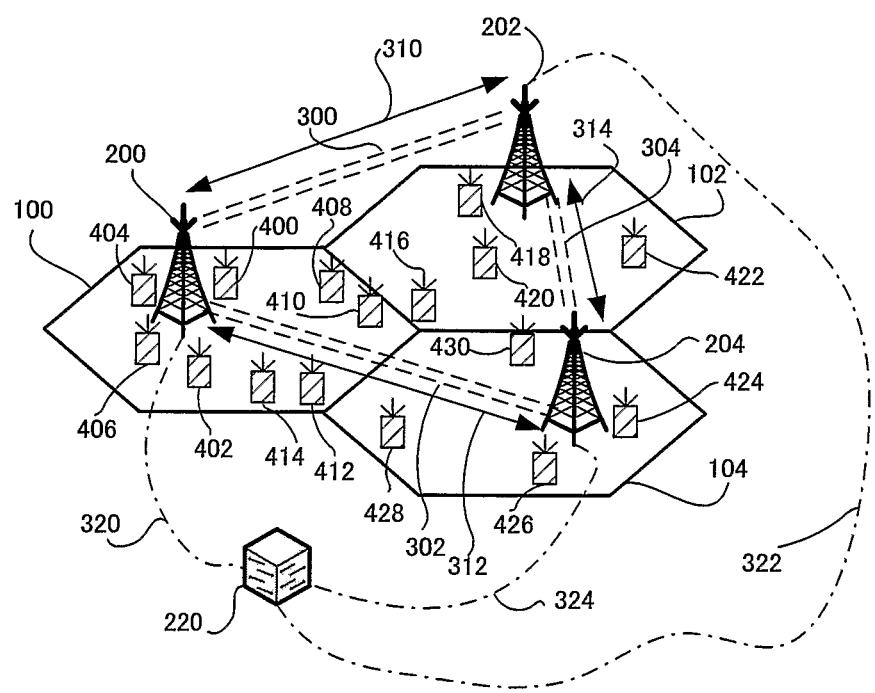
FIG. 5 is a schematic drawing illustrating multi-cell communication system.

FIG. 5 is a schematic drawing illustrating a multi-cell communication system. The cellular system divides service-covered area into conjoint wireless covered areas, i.e., cells. In the FIG. 5, the cell is schematically depicted as a regular hexagon and the whole service area is conjoined by cells 100-104. Cells 100-104 are respectively related to base stations 200-204. Each one of the base station 200-204 includes at least a transmitter and a receiver as well known in the art. Note that the base station is basically a serving node in the cell, which may be an independent base station with a resource scheduling function, a transmit node dependent on the independent base station, or a relay node (usually installed to further enlarge the cell covered range). In the FIG. 5, the base stations 200-204 are schematically depicted as locating at certain areas in the cells 100-104 and are configured with omni-directional antennas. However, in the cell layout of the cellular communication system, the base stations 200-204 may be configured with directional antennas directionally covering part areas of the cells 100-104 and such part areas are normally called sectors. Therefore, the illustrated example of the multi-cell communication system in FIG. 5 is only for illustration purpose, and it does not mean that implementation of the present invention in the cellular system requires the above limited specific conditions.

In the FIG. 5, the base stations 200-204 are connected with each other through X2 interfaces 300-304. In LTE system, a three-layer node network structure consisting of base station, wireless network control unit and cored network is simplified into a two-layer node structure. Functions of the wireless network control unit are assigned to the base station, and the base stations coordinate and communicate through wired interface "X2".

In the FIG. 5, there are connected air interfaces "A1 interfaces" 310-314 among the base stations 200-204. In the future communication system, the concept of relay nodes may be introduced and the relay nodes are connected through wireless interfaces. The base station may be considered as a special relay node and thus there may exist wireless interfaces "A1" between the base stations for coordination and communication.

FIG. 5 further illustrates an upper layer entity 220 (or other network entity such as a gateway or a mobile management entity) of the base stations 200-204, which is connected with the base stations 200-204 through S1 interfaces 320-324. In the LTE system, the upper layer entity and the base station coordinate and communicate through wired interfaces "S1" therebetween.

In FIG. 5, a few user equipments 400-430 are distributed in the cells 100-104. As known by the skills in the art, each of the user equipments 400-430 includes a transmitter, a receiver and a mobile terminal control unit. Each of the user equipments 400-430 accesses a cellular communication system through a serving base station (one of base stations 200-204) serving the user equipment individually. It is to be noted that although FIG. 5 schematically illustrates 16 user equipments, the number of the user equipments in practical environment is very large. The illustration of user equipments in FIG. 5 is only for the depictive purpose. Each of the user equipments 400-430 accesses a cellular communication system through a serving base station 200-204 serving the user equipment individually. A base station providing services to a user equipment directly is called a serving base station of the user equipment and other base stations are called non-serving base stations of the user equipment. The non-serving base station may be a cooperative base station of the serving base station, and may together with the serving base station provide communication services to the user equipment.

In the present embodiment, it is assumed that the user equipment 416 is configured with two receive antennas and works in a multi-antenna-multi-base-station cooperation mode, the serving base station is base station 202 and the cooperative base stations are base stations 200 and 204. Note that although the present embodiment is described with the user equipment 416, it does not mean that the present invention is applicable to only one user equipment. In practical, the present invention is applicable to multi-user-equipments scenario. For example, user equipments 408, 410, 430 and etc. in FIG. 5 may adopt the method of present invention. There is one serving base station and two cooperative base stations in the implementary scenario, however, the present invention is not limited to such limited conditions. In fact, there is no specific limitation on the number of the serving base stations and cooperative base stations.

In the various embodiments of present description, detailed configuration of LTE system may refer to a document of 3GPP organization "TS 36.213 V8.3.0, "Evolved Universal Terrestrial Radio Access (E-UTRA)"". The document defines seven transmission schemes for downlink data:

(1) single antenna transmission scheme: this scheme utilizes single antenna to transmit signal and is a specific example in MIMO system. This scheme can only transmit single layer data.

(2) transmit diversity scheme: in MIMO system, diversity effects of time and/or frequency are utilized to transmit signal so as to improve receive quality of the signal. This scheme can only transmit single layer data.

(3) open-loop space division multiplexing scheme: it is not necessary for the user equipment to feed back space division multiplexing of space-domain precoding information.

(4) close-loop space division multiplexing scheme: it is necessary for the user equipment to feed back space division multiplexing of channel station information.

(5) multi-user MIMO: multiple users perform the downlink communication of MIMO system in common frequency simultaneously.

(6) close-loop single-layer precoding: this scheme transmits only single-layer data by using MIMO system and precoding technology.

(7) beamforming transmission: this scheme adopts MIMO system and beamforming technologies and is configured with a dedicated reference signal for data demodulation of the user equipment.

It is to be noted that in the present invention when the serving base station and the cooperative base station of the user equipment adopt the transmission scheme of transmit diversity, the transmit diversity may be combinations or extensions of various diversity technologies such as time diversity, frequency diversity, space diversity, phase delay diversity, etc. The diversity processing may be a centralized processing or a distributed processing. It is to be further noted that adopting downlink data transmission scheme defined by the LTE system is only an example for explaining the present invention and it does not mean that the present invention requires the above limited conditions in the implementation procedure.

A following multi-antenna-multi-base-station cooperation scenario is adopted to explain the present embodiment.

Embodiment scenario 1: the user equipment 416 is configured with two receive antennas and works in a downlink multi-antenna-multi-base-station cooperation mode. The serving base station of the user equipment 416 is base station 202 and cooperative base stations are base stations 200 and 204. In multi-antenna-multi-base-station cooperation transmission, both the base stations 200 and 202 use four transmit antennas and the base station 204 uses two transmit antennas.

Embodiment scenario 2: the user equipment 416 is configured with four receive antennas and works in a downlink multi-antenna-multi-base-station cooperation mode.

The serving base station of the user equipment 416 is base station 202 and cooperative base stations are base stations 200 and 204. In multi-antenna-multi-base-station cooperation transmission, the base station 200 uses eight transmit antennas, the base station 202 uses four transmit antennas and the base station 204 uses two transmit antennas.

It is to be noted that detailed numerical values in above inconsistent antenna configurations are used as an example for explaining the present invention and the present invention is not limited to these numerical value limitations and is applicable to other inconsistent antenna configuration scenarios. Note that those skills in the art may understand that the scheme proposed by the present invention may be adopted in an inconsistent antenna configuration scenario in normal circumstances by reading embodiments of the present invention.

Figure 6:
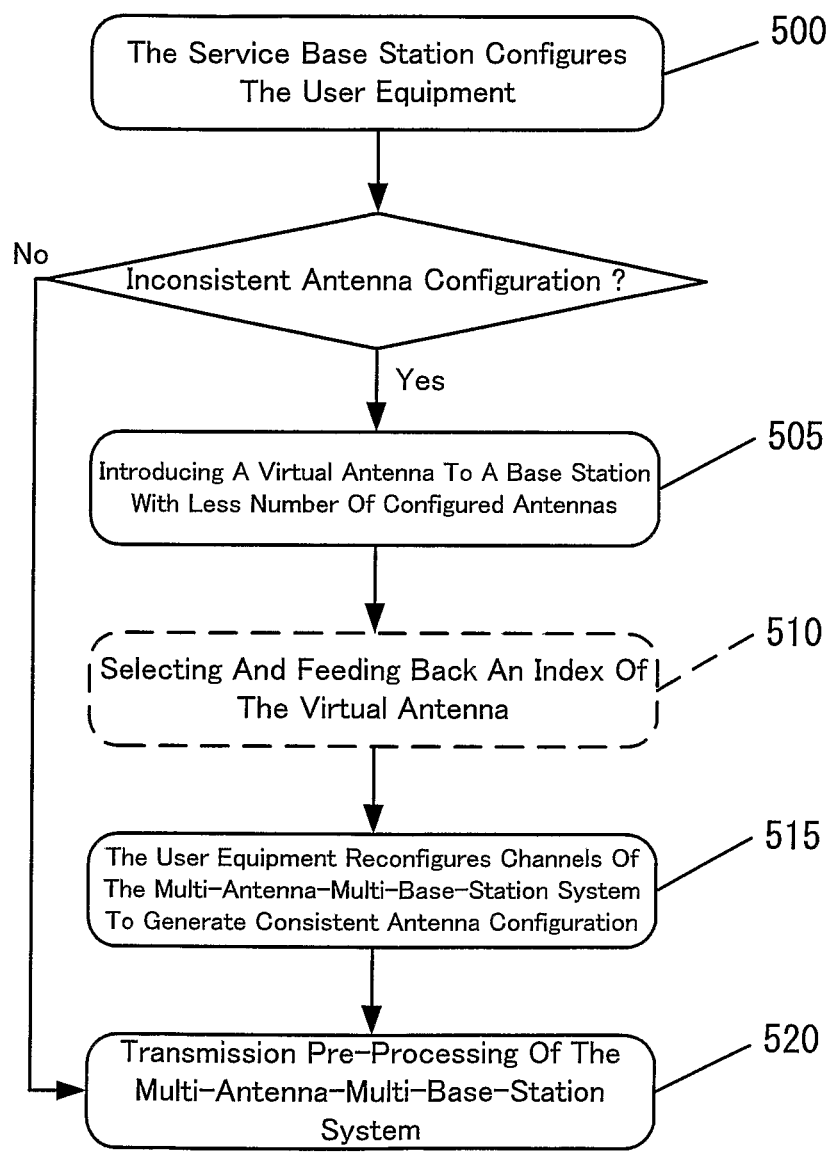
FIG. 6 is a flow chart illustrating a channel reconstruction method for downlink multi-antenna-multi-base-station according to the present invention.

FIG. 6 is a flow chart illustrating a multi-antenna-multi-base-station cooperation method in downlink cellular system according to the present invention. As shown in FIG. 6, the method according to the present invention includes following steps.

Step 500: the serving base station configures the user equipment and generates configuration information for the user equipment. The configuration information includes at least identification information of a cooperative base station (for example, cell identifier (ID)) and respective numbers of antennas configured by the serving base station and the cooperative base station for the user equipment.

In the present embodiment, two application examples are described.

Example of embodiment scenario 1: the serving base station of the user equipment 416 is base station 202 and the cooperative base stations are base station 200 and 204. Base stations 200, 202 and 204 notify the user equipment through their own broadcasting channels, respectively. Both the base stations 200 and 202 use four transmit antennas and the base station 204 uses two transmit antennas.

Example of embodiment scenario 2: the serving base station of the user equipment 416 is base station 202 and the cooperative base stations are base station 200 and 204. The base station 202 notifies the user equipment 416 through a broadcasting channel by using four transmit antennas. In addition, the serving base station 202 transmits to the user equipment 416 the cell identifiers (cell IDs) of the cooperative base stations 200 and 204 and antenna configuration (that the base station 200 use eight transmit antennas and the base station 204 uses two transmit antennas) through downlink control signalings.

It is to be noted that the above examples are only used to illustrate how the serving base station configures the user equipment according to the present invention and the configuration information of the serving base station according to the present invention is not limited to the described form.

Step 505: if the serving base station and respective cooperative base stations configure different number of antennas to the user equipment, virtual antennas are introduced to the base station that configure less number of antennas.

In the method of introducing virtual antennas according to one scheme of the present invention, dummy antennas are added to a base station with fewer antennas, i.e., dummy antennas with null power are added to the base station with fewer antennas, such that the antenna configuration of the multi-antenna-multi-base-station system becomes consistent, in other words, making the serving base station and respective cooperative base stations to configure consistent number of antennas for the user equipment.

Alternatively, in the method of introducing virtual antennas according to another scheme of the present invention, clonal antennas are added to a base station with fewer antennas, i.e., real antenna are copied and extended (in a sequential manner according to the sequence number of the antenna), such that the antenna configuration of the multi-antenna-multi-base-station system becomes consistent, in other words, making the serving base station and respective cooperative base stations to configure consistent number of antennas to the user equipment.

On the other hand, if the serving base station and respective cooperative base stations configure consistent number of antennas to the user equipment, Step 520 (transmission pre-processing of the multi-antenna-multi-base-station system) is executed directly.

In the present embodiment, four application examples are presented.

Figure 7:
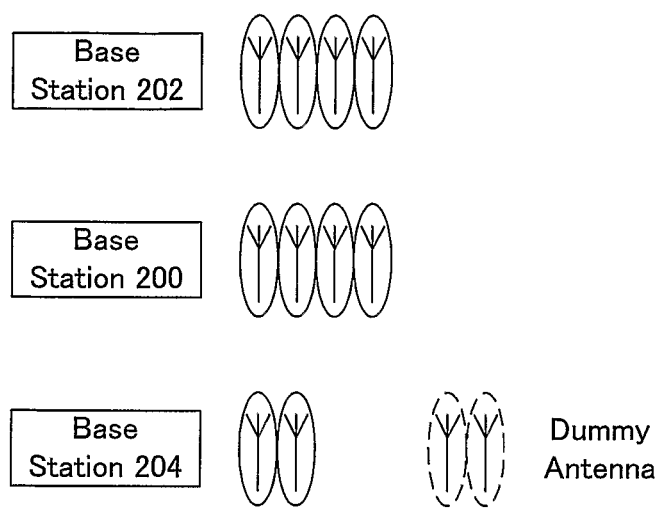
FIG. 7 is a schematic drawing illustrating dummy antennas added in example scenario 1.

Example (a) of the embodiment scenario 1: the user equipment 416 is configured with two receive antennas, and its serving base station is base station 202 and cooperative base stations are base stations 200 and 204. The base stations 200 and 202 both use four transmit antennas and the base station 204 uses two transmit antennas. It is assumed that a channel matrix from the serving base station 202 to the user equipment 416 is $$H_{202} = \begin{bmatrix} h_{11}^{(202)} & h_{12}^{(202)} & h_{13}^{(202)} & h_{14}^{(202)} \\ h_{21}^{(202)} & h_{22}^{(202)} & h_{23}^{(202)} & h_{24}^{(202)} \end{bmatrix}$$

which is a 2×4 matrix (in which the number of receive antennas is first dimension of the channel matrix and the number of transmit antennas is second dimension of the channel matrix) and channel matrixes from the cooperative base stations 200 and 204 to the user equipment 416 are $$H_{200} = \begin{bmatrix} h_{11}^{(200)} & h_{12}^{(200)} & h_{13}^{(200)} & h_{14}^{(200)} \\ h_{21}^{(200)} & h_{22}^{(200)} & h_{23}^{(200)} & h_{24}^{(200)} \end{bmatrix} \text{ and } H_{204} = \begin{bmatrix} h_{11}^{(204)} & h_{12}^{(204)} \\ h_{21}^{(204)} & h_{22}^{(204)} \end{bmatrix},$$

respectively, which are a 2×4 matrix and a 2×2 matrix, respectively. In this example, the base station 204 has fewer antennas and two dummy antennas, i.e., two virtual antennas with null power, are added to it such that the base stations 200, 202 and 204 all use four antennas to transmit signal for the user equipment 416. The schematic implementation is illustrated in FIG. 7.

Figure 8:
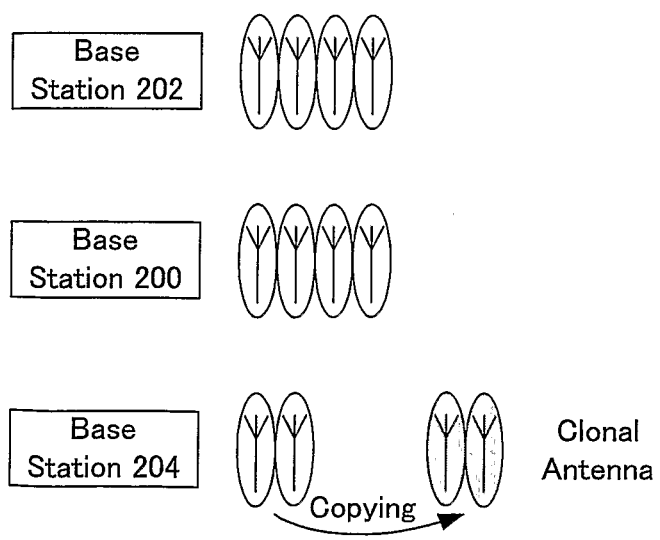
FIG. 8 is a schematic drawing illustrating clonal antennas added in example scenario 1.

Example (b) of the embodiment scenario 1: the user equipment 416 is configured with two receive antennas, and its serving base station is base station 202 and cooperative base stations are base stations 200 and 204. The base stations 200 and 202 both use four transmit antennas and the base station 204 uses two transmit antennas. It is assumed that a channel matrix from the serving base station 202 to the user equipment 416 is $$H_{202} = \begin{bmatrix} h_{11}^{(202)} & h_{12}^{(202)} & h_{13}^{(202)} & h_{14}^{(202)} \\ h_{21}^{(202)} & h_{22}^{(202)} & h_{23}^{(202)} & h_{24}^{(202)} \end{bmatrix}$$

which is a 2×4 matrix (in which the number of receive antennas is first dimension of the channel matrix and the number of transmit antennas is second dimension of the channel matrix) and channel matrixes from the cooperative base stations 200 and 204 to the user equipment 416 are $$H_{200} = \begin{bmatrix} h_{11}^{(200)} & h_{12}^{(200)} & h_{13}^{(200)} & h_{14}^{(200)} \\ h_{21}^{(200)} & h_{22}^{(200)} & h_{23}^{(200)} & h_{24}^{(200)} \end{bmatrix} \text{ and } H_{204} = \begin{bmatrix} h_{11}^{(204)} & h_{12}^{(204)} \\ h_{21}^{(204)} & h_{22}^{(204)} \end{bmatrix},$$

respectively, which are a 2×4 matrix and a 2×2 matrix, respectively. In this example, the base station 204 has fewer antennas and two clonal antennas are added to it, i.e., two real antennas are sequentially copied and extended to form four antennas, such that the base stations 200, 202 and 204 all use four antennas to transmit signal for the user equipment 416. The schematic implementation is illustrated in FIG. 8.

Figure 9:
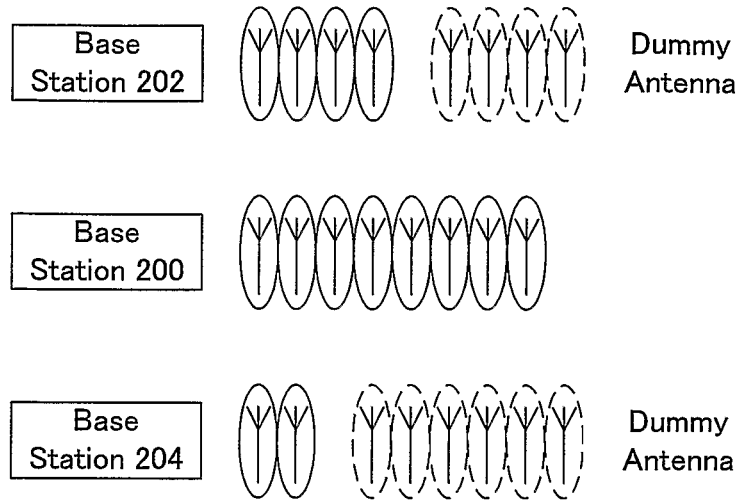
FIG. 9 is a schematic drawing illustrating dummy antennas added in example scenario 1.

Example (a) of the embodiment scenario 2: the user equipment 416 is configured with four receive antennas, and its serving base station is base station 202 and cooperative base stations are base stations 200 and 204. The base station 200 uses eight transmit antennas, the base station 202 uses four transmit antennas and the base station 204 uses two transmit antennas. It is assumed that a channel matrix from the serving base station 202 to the user equipment 416 is $$H_{202} = \begin{bmatrix} h_{11}^{(202)} & h_{12}^{(202)} & h_{13}^{(202)} & h_{14}^{(202)} \\ h_{21}^{(202)} & h_{22}^{(202)} & h_{23}^{(202)} & h_{24}^{(202)} \\ h_{31}^{(202)} & h_{32}^{(202)} & h_{33}^{(202)} & h_{34}^{(202)} \\ h_{41}^{(202)} & h_{42}^{(202)} & h_{43}^{(202)} & h_{44}^{(202)} \end{bmatrix},$$

which is a 4×4 matrix (in which the number of receive antennas is first dimension of the channel matrix and the number of transmit antennas is second dimension of the channel matrix) and channel matrixes from the cooperative base stations 200 and 204 to the user equipment 416 are $$H_{200} = \begin{bmatrix} h_{11}^{(200)} & h_{12}^{(200)} & h_{13}^{(200)} & h_{14}^{(200)} & h_{15}^{(200)} & h_{16}^{(200)} & h_{17}^{(200)} & h_{18}^{(200)} \\ h_{21}^{(200)} & h_{22}^{(200)} & h_{23}^{(200)} & h_{24}^{(200)} & h_{25}^{(200)} & h_{26}^{(200)} & h_{27}^{(200)} & h_{28}^{(200)} \\ h_{31}^{(200)} & h_{32}^{(200)} & h_{33}^{(200)} & h_{34}^{(200)} & h_{35}^{(200)} & h_{36}^{(200)} & h_{37}^{(200)} & h_{38}^{(200)} \\ h_{41}^{(200)} & h_{42}^{(200)} & h_{43}^{(200)} & h_{44}^{(200)} & h_{45}^{(200)} & h_{46}^{(200)} & h_{47}^{(200)} & h_{48}^{(200)} \end{bmatrix}$$

and $$H_{204} = \begin{bmatrix} h_{11}^{(204)} & h_{12}^{(204)} \\ h_{21}^{(204)} & h_{22}^{(204)} \\ h_{31}^{(204)} & h_{32}^{(204)} \\ h_{41}^{(204)} & h_{42}^{(204)} \end{bmatrix},$$

respectively, which are a 4×8 matrix and a 4×2 matrix, respectively. In this example, the base stations 202 and 204 have fewer antennas and four and six dummy antennas, i.e., virtual antennas with null power, are added to these two base stations respectively such that the base stations 200, 202 and 204 all use eight antennas to transmit signal for the user equipment 416. The schematic implementation is illustrated in FIG. 9.

Figure 10:
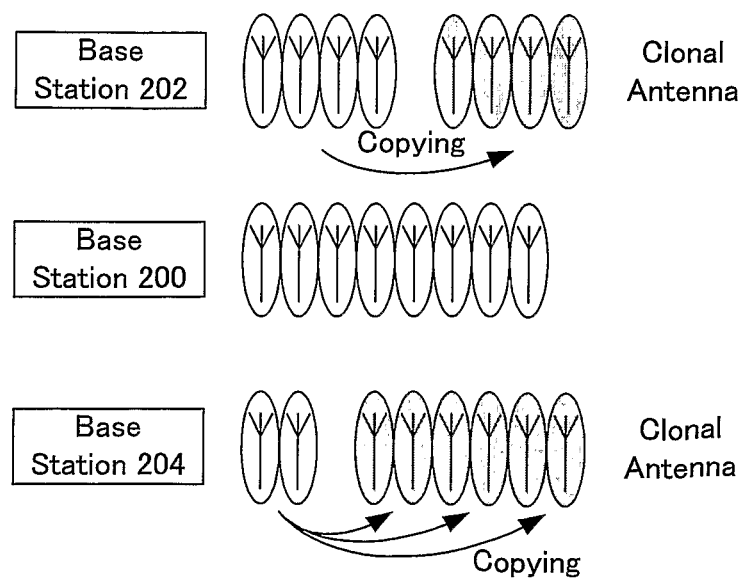
FIG. 10 is a schematic drawing illustrating clonal antennas added in example scenario 1.

Example (b) of the embodiment scenario 2: the user equipment 416 is configured with four receive antennas, and its serving base station is base station 202 and cooperative base stations are base stations 200 and 204. The base station 200 uses eight transmit antennas, the base station 202 uses four transmit antennas and the base station 204 uses two transmit antennas. It is assumed that a channel matrix from the serving base station 202 to the user equipment 416 is $$H_{202} = \begin{bmatrix} h_{11}^{(202)} & h_{12}^{(202)} & h_{13}^{(202)} & h_{14}^{(202)} \\ h_{21}^{(202)} & h_{22}^{(202)} & h_{23}^{(202)} & h_{24}^{(202)} \\ h_{31}^{(202)} & h_{32}^{(202)} & h_{33}^{(202)} & h_{34}^{(202)} \\ h_{41}^{(202)} & h_{42}^{(202)} & h_{43}^{(202)} & h_{44}^{(202)} \end{bmatrix},$$

which is a 4×4 matrix (in which the number of receive antennas is first dimension of the channel matrix and the number of transmit antennas is second dimension of the channel matrix) and channel matrixes from the cooperative base stations 200 and 204 to the user equipment 416 are $$H_{200} = \begin{bmatrix} h_{11}^{(200)} & h_{12}^{(200)} & h_{13}^{(200)} & h_{14}^{(200)} & h_{15}^{(200)} & h_{16}^{(200)} & h_{17}^{(200)} & h_{18}^{(200)} \\ h_{21}^{(200)} & h_{22}^{(200)} & h_{23}^{(200)} & h_{24}^{(200)} & h_{25}^{(200)} & h_{26}^{(200)} & h_{27}^{(200)} & h_{28}^{(200)} \\ h_{31}^{(200)} & h_{32}^{(200)} & h_{33}^{(200)} & h_{34}^{(200)} & h_{35}^{(200)} & h_{36}^{(200)} & h_{37}^{(200)} & h_{38}^{(200)} \\ h_{41}^{(200)} & h_{42}^{(200)} & h_{43}^{(200)} & h_{44}^{(200)} & h_{45}^{(200)} & h_{46}^{(200)} & h_{47}^{(200)} & h_{48}^{(200)} \end{bmatrix}$$

and $$H_{204} = \begin{bmatrix} h_{11}^{(204)} & h_{12}^{(204)} \\ h_{21}^{(204)} & h_{22}^{(204)} \\ h_{31}^{(204)} & h_{32}^{(204)} \\ h_{41}^{(204)} & h_{42}^{(204)} \end{bmatrix},$$

respectively, which are a 4×8 matrix and a 4×2 matrix, respectively. In this example, the base stations 202 and 204 have fewer antennas and four and six clonal antennas are added to these two base stations respectively, i.e., real antennas are sequentially copied and extended to form eight antennas, such that the base stations 200, 202 and 204 all use eight antennas to transmit signal for the user equipment 416. The schematic implementation is illustrated in FIG. 10.

It is to be noted that the above examples are only used to describe implementations of virtual antenna introduction according to the present invention, and the virtual antenna configuration according to the present invention is not limited to the explained form in the examples.

Step 510: the user equipment selects and feeds back indices of the virtual antennas.

According to one scheme of the present invention, the indices of the virtual antennas are a predetermined mapping table at the receive-transmit sides (between the user equipment and the serving base station and between the user equipment and the cooperative base station). In such circumstances, the user equipment introduces the virtual antennas to the base station with less number of antennas according to the mapping table. The information is known by the serving base station and cooperative base stations. Therefore, Step 510 may be omitted and no information is fed back.

Alternatively, according to another scheme of the present invention, the user equipment feeds back the virtual antenna indices of the serving base station and respective cooperative base stations only to the serving base station.

Alternatively, according to another scheme of the present invention, the user equipment feeds back the virtual antenna indices of the serving base station and respective cooperative base stations to the serving base station and cooperative base stations, respectively.

Eight application examples are presented in the present embodiment.

Example (a1) of the embodiment scenario 1: in FIG. 7, the base station 204 has fewer antennas and two dummy antennas, i.e., two virtual antennas with null power, are added to the base station 204 such that the base stations 200, 202 and 204 all use four antennas to transmit signal for the user equipment 416. The indices of two dummy antennas of the base station 204 are a mapping table showing correspondence from the dummy antennas to antenna ports. The present example adopts a mapping table predetermined by the receive-transmit sides, which is shown as Table 1. Table 1 is looked up for the base station 204 with two real antennas and two added dummy antennas, and resulted indices for the two dummy antennas are "mapped to No. 3-4 antennas" in Column 2, Line 3. The indices are known at the receive-transmit sides and thus the user equipment 416 does not need to feed back the virtual antenna indices.

TABLE 1

| The number of added dummy antennas | virtual antenna indices (example (a1) of embodiment scenarios 1 and 2) | |
|---|---|---|
| | The number of real antennas is 2 | The number of real antennas is 4 |
| 1 | mapped to No. 3 antenna | mapped to No. 5 antenna |
| 2 | mapped to No. 3-4 antennas | mapped to No. 5-6 antennas |
| 3 | mapped to No. 3-5 antennas | mapped to No. 5-7 antennas |
| 4 | mapped to No. 3-6 antennas | mapped to No. 5-8 antennas |
| 5 | mapped to No. 3-7 antennas | / |
| 6 | mapped to No. 3-8 antennas | / |

Figure 11:
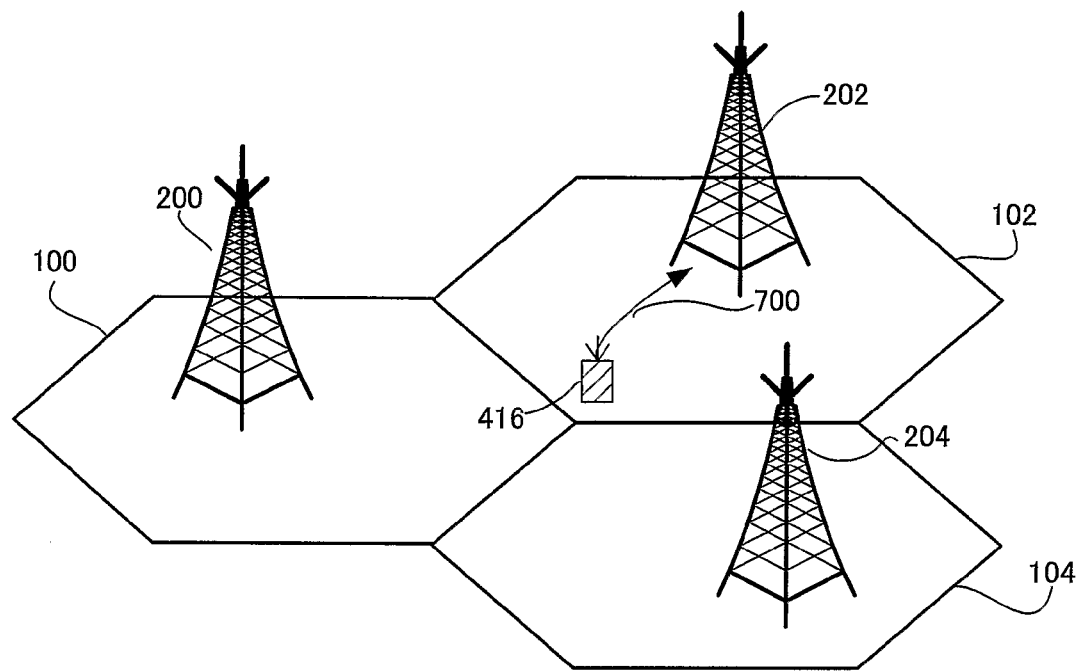
FIG. 11 is a schematic diagram illustrating that a user equipment 416 only feeds back indices of virtual antennas to a serving base station.
Figure 12:
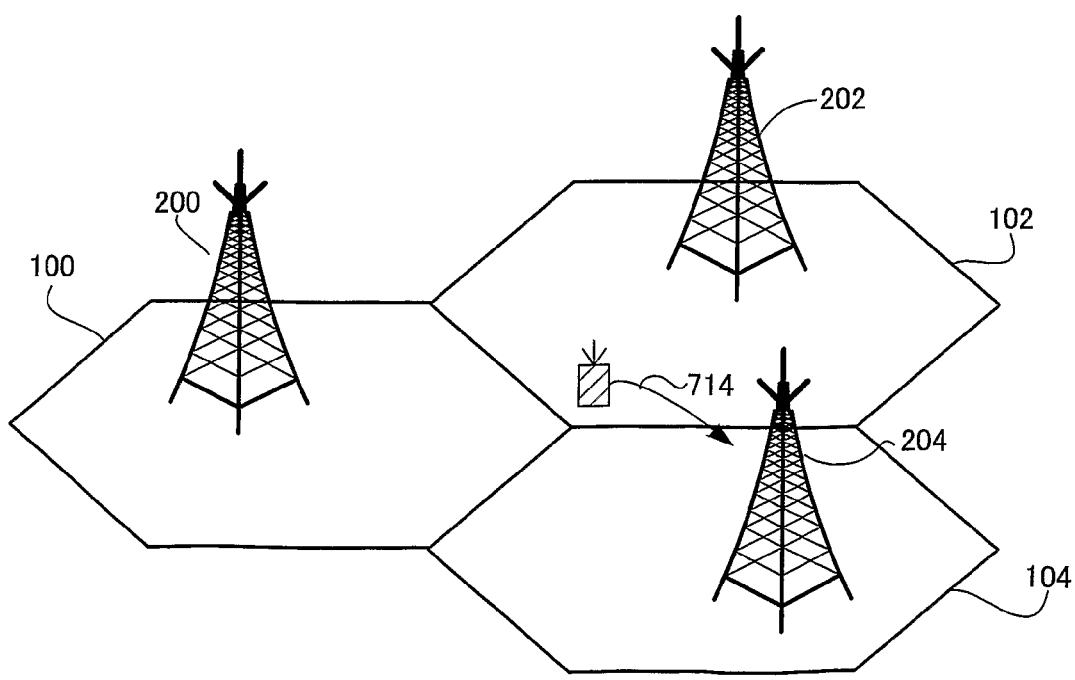
FIG. 12 is a schematic drawing illustrating that the user equipment 416 feeds back the indices of the virtual antennas to a cooperative base station.

Example (a2) of the embodiment scenario 1: in FIG. 7, the base station 204 has fewer antennas and two dummy antennas, i.e., two virtual antennas with null power, are added to the base station 204 such that the base stations 200, 202 and 204 all use four antennas to transmit signal for the user equipment 416. The indices of two dummy antennas of the base station 204 are a mapping table showing correspondence from the dummy antennas to the antenna ports. In the present example, the use equipment 416 selects the indices of the virtual antennas and decides that the first dummy antenna is mapped to the second antenna and the second dummy antenna is mapped to the third antenna. The base station side does not know the indices and thus the user equipment 416 needs to feed back the index result of the virtual antennas. There are two feedback schemes. One scheme is that the user equipment 416 feeds back the virtual antenna indices of the cooperative base station 204 only to the serving base station 202 (which is shown in FIG. 11 in which signaling 700 is the index result fed back from the user equipment 416 to the serving base station 202) and the other scheme is that the user equipment 416 feeds back the virtual antenna indices of the cooperative base station 204 to the cooperative base station 204 (which is shown in FIG. 12 in which signaling 714 is the index result fed back from the user equipment 416 to the cooperative base station 204).

Example (b1) of the embodiment scenario 1: in FIG. 8, the base station 204 has fewer antennas and two clonal antennas are added to it, i.e., two real antennas are copied and extended to form four antennas such that the base stations 200, 202 and 204 all use four antennas to transmit signal for the user equipment 416. The indices of two clonal antennas of the base station 204 are a mapping table showing correspondence from the clonal antennas to the antenna ports. The present example adopts a mapping table predetermined by the receive-transmit sides, which is shown as Table 2. Table 2 is looked up for the base station 204 with two real antennas and two added clonal antennas, and resulted indices for the two clonal antennas are "mapped to No. 3-4 antennas" in Column 2, Line 3. The indices are known at the receive-transmit sides and thus the user equipment 416 does not need to feed back the virtual antenna indices.

TABLE 2 virtual antenna index (example (b1) of embodiment scenarios 1 and 2)

| The number of added clonal antennas | The number of real antennas is 2 | The number of real antennas is 4 |
|---|---|---|
| 1 | mapped to No. 3 antenna | mapped to No. 5 antenna |
| 2 | mapped to No. 3-4 antennas | mapped to No. 5-6 antennas |
| 3 | mapped to No. 3-5 antennas | mapped to No. 5-7 antennas |
| 4 | mapped to No. 3-6 antennas | mapped to No. 5-8 antennas |
| 5 | mapped to No. 3-7 antennas | / |
| 6 | mapped to No. 3-8 antennas | / |

Example (b2) of the embodiment scenario 1: in FIG. 8, the base station 204 has fewer antennas and two clonal antennas are added to it, i.e., two real antennas are copied and extended to form four antennas, such that the base stations 200, 202 and 204 all use four antennas to transmit signal for the user equipment 416. The indices of two clonal antennas of the base station 204 are a mapping table showing correspondence from the clonal antennas to the antenna ports. In the present example, the use equipment 416 selects the indices of the clonal antennas and decides that the first clonal antenna is mapped to the second antenna and the second clonal antenna is mapped to the third antenna. The base station side does not know the indices and thus the user equipment 416 needs to feed back the index result of the virtual antennas. There are two feedback schemes. One scheme is that the user equipment 416 feeds back the virtual antenna indices of the cooperative base station 204 only to the serving base station 202 (which is shown in FIG. 11 in which signaling 700 is the index result fed back from the user equipment 416 to the serving base station 202) and the other scheme is that the user equipment 416 feeds back the virtual antenna indices of the cooperative base station 204 to the cooperative base station 204 (which is shown in FIG. 12 in which signaling 714 is the index result fed back from the user equipment 416 to the cooperative base station 204).

Example (a1) of the embodiment scenario 2: in FIG. 9, the base stations 202 and 204 have fewer antennas and four and six dummy antennas, i.e., virtual antennas with null power, are added to them respectively such that the base stations 200, 202 and 204 all use eight antennas to transmit signal for the user equipment 416. The dummy antenna indices of the base stations 202 and 204 are a mapping table showing correspondence from the dummy antennas to the antenna ports. In the present example, the receive-transmit sides use a predetermined mapping table, which is shown as Table 1. Table 1 is looked up for the base station 202 with four real antennas and four added dummy antennas, and resulted dummy antenna indices for the four dummy antennas are "mapped to No. 5-8 antennas" in Column 3, Line 5. Table 1 is also looked up for the base station 204 with two real antennas and six added dummy antennas, and resulted dummy antenna indices for the six dummy antennas are "mapped to No. 3-8 antennas" in Column 2, Line 7. The indices are known at the receive-transmit sides and thus the user equipment 416 does not need to feed back the virtual antenna indices.

Figure 13:
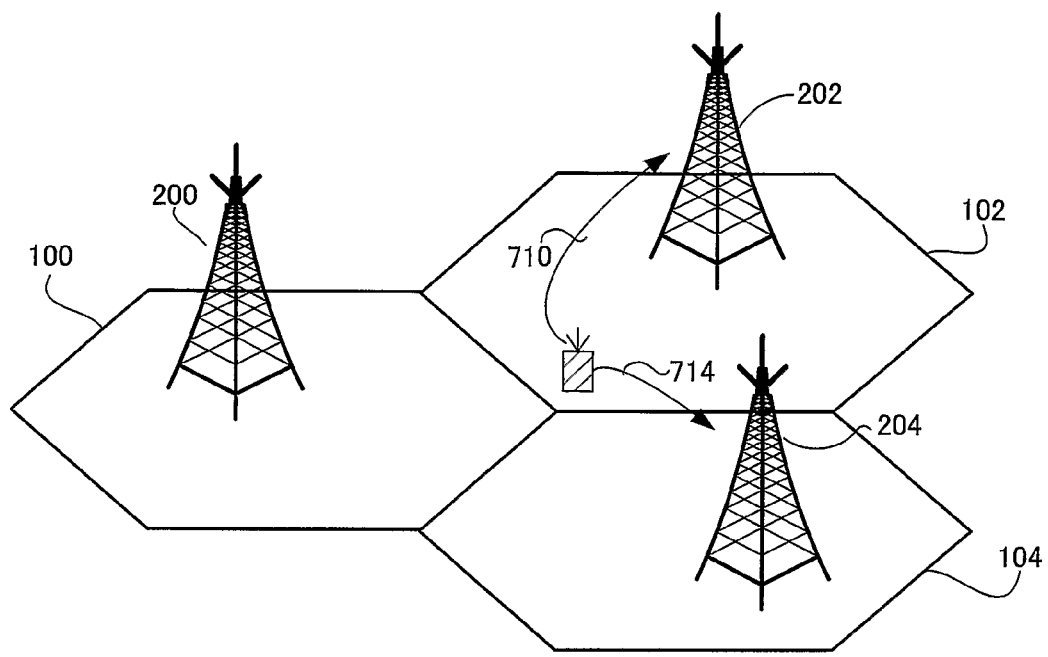
FIG. 13 is a schematic drawing illustrating that the user equipment 416 feeds back the indices of the virtual antennas to the serving base station and the cooperative base station.

Example (a2) of the embodiment scenario 2: in FIG. 9, the base stations 202 and 204 have fewer antennas and four and six dummy antennas, i.e., virtual antennas with null power, are added to them respectively such that the base stations 200, 202 and 204 all use eight antennas to transmit signal for the user equipment 416. The dummy antenna indices of the base stations 202 and 204 are a mapping table showing correspondence from the dummy antennas to the antenna ports. In the present example, the use equipment 416 selects the virtual antenna indices, decides for the base station 202 that four dummy antennas are mapped to No. 2, 3, 6 and 8 antennas respectively, and decides for the base station 204 that six dummy antennas are mapped to No. 2, 3, 4, 6, 7 and 8 antennas. The base station side does not know the indices and thus the user equipment 416 needs to feed back the index results of the virtual antennas. There are two feedback schemes. One scheme is that the user equipment 416 feeds back the virtual antenna indices of the cooperative base station 204 only to the serving base station 202 (which is shown in FIG. 11 in which signaling 700 is the index result fed back from the user equipment 416 to the serving base station 202) and the other scheme is that the user equipment 416 feeds back the virtual antenna indices of the serving base station 202 and the cooperative base station 204 to the serving base station 202 and the cooperative base station 204 respectively (which is shown in FIG. 13 in which signalings 710 and 714 are the index results fed back from the user equipment 416 to the serving base station 202 and the cooperative base station 204).

Example (b1) of the embodiment scenario 2: in FIG. 10, the base stations 202 and 204 have fewer antennas and four and six clonal antennas are added to them respectively, i.e., real antennas are sequentially copied and extended, such that the base stations 200, 202 and 204 all use eight antennas to transmit signal for the user equipment 416. The clonal antenna indices of the base stations 202 and 204 are a mapping table showing correspondence from the clonal antennas to the antenna ports. In the present example, the receive-transmit sides use a predetermined mapping table, which is shown as Table 2. Table 2 is looked up for the base station 202 with four real antennas and four added clonal antennas, and the resulted indices for the four clonal antennas are "mapped to No. 5-8 antennas" in Column 3, Line 5. Table 1 is also looked up for the base station 204 with two real antennas and six added clonal antennas, and the resulted indices for the six clonal antennas are "mapped to No. 3-8 antennas" in Column 2, Line 7. The indices are known at the receive-transmit sides and thus the user equipment 416 does not need to feed back the virtual antenna indices.

Example (b2) of the embodiment scenario 2: in FIG. 10, the base stations 202 and 204 have fewer antennas and four and six clonal antennas are added to them respectively, i.e., real antennas are sequentially copied and extended, such that the base stations 200, 202 and 204 all use eight antennas to transmit signal for the user equipment 416. The clonal antenna indices of the base stations 202 and 204 are a mapping table showing correspondence from the clonal antennas to the antenna ports. In the present example, the use equipment 416 selects the virtual antenna indices, decides for the base station 202 that four clonal antennas are mapped to No. 2, 3, 6 and 8 antennas respectively, and decides for the base station 204 that six clonal antennas are mapped to No. 2, 3, 4, 6, 7 and 8 antennas. The base station side does not know the indices and thus the user equipment 416 needs to feed back the index results of the virtual antennas. There are two feedback schemes. One scheme is that the user equipment 416 feeds back the virtual antenna indices of the cooperative base station 204 only to the serving base station 202 (which is shown in FIG. 11 in which signaling 700 is the index result fed back from the user equipment 416 to the serving base station 202) and the other scheme is that the user equipment 416 feeds back the virtual antenna indices of the serving base station 202 and the cooperative base station 204 to the serving base station 202 and the cooperative base station 204 respectively (which is shown in FIG. 13 in which signalings 710 and 714 are the index results fed back from the user equipment 416 to the serving base station 202 and the cooperative base station 204).

It is to be noted that the above examples are only used to describe implementations of virtual antenna selection and feedback according to the present invention, and the virtual antenna selection and feedback according to the present invention is not limited to the explained form in the examples.

Step 515: channels of the multi-antenna-multi-base-station system are reconstructed at the user equipment side so as to generate a consistent antenna configuration.

According to one scheme of the present invention, when adopting the dummy antennas as the virtual antennas, according to the dummy antenna indices, channel elements corresponding to the dummy antennas are set to 0 and power correction is performed for channel elements at other positions such that the introduction of the dummy antennas will not change total power of the base station.

According to another scheme of the present invention, when adopting the clonal antennas as the virtual antennas, according to the clonal antenna indices, channel element values of the real antennas are sequentially copied to channel element positions corresponding to the clonal antennas.

In the present embodiment, eight application examples are described.

Example (a1) of the embodiment scenario 1: in FIG. 7, the base station 204 has fewer antennas and two dummy antennas, i.e., two virtual antennas with null power, are added to the base station 204 such that the base stations 200, 202 and 204 all use four antennas to transmit signal for the user equipment 416. The indices of two dummy antennas of the base station 204 are "mapped to No. 3-4 antennas". Therefore, according to the indices, the channel elements corresponding to the No. 3-4 antennas are set to 0 and the power correction is performed for channel elements at other positions, resulting in $$H_{204} = \begin{bmatrix} \sqrt{2}\,h_{11}^{(204)} & \sqrt{2}\,h_{12}^{(204)} & 0 & 0 \\ \sqrt{2}\,h_{21}^{(204)} & \sqrt{2}\,h_{22}^{(204)} & 0 & 0 \end{bmatrix} \cdot \sqrt{2}$$

is a power correction factor used to cause the dummy antenna introduction not to change the total power of the base station 204.

Example (a2) of the embodiment scenario 1: in FIG. 7, the base station 204 has fewer antennas and two dummy antennas, i.e., two virtual antennas with null power, are added to the base station 204 such that the base stations 200, 202 and 204 all use four antennas to transmit signal for the user equipment 416. The indices of two dummy antennas of the base station 204 are that the first dummy antenna is mapped to the second antenna and the second dummy antenna is mapped to the third antenna. Therefore, according to the indices, the channel elements corresponding to the No. 3-4 antennas are set to 0 and the power correction is performed for channel elements at other positions, resulting in $$H_{204} = \begin{bmatrix} \sqrt{2}\,h_{11}^{(204)} & 0 & 0 & \sqrt{2}\,h_{12}^{(204)} \\ \sqrt{2}\,h_{21}^{(204)} & 0 & 0 & \sqrt{2}\,h_{22}^{(204)} \end{bmatrix} \cdot \sqrt{2}$$

is a power correction factor used to cause the dummy antenna introduction not to change the total power of the base station 204.

Example (b1) of the embodiment scenario 1: in FIG. 8, the base station 204 has fewer antennas and two clonal antennas are added to it, i.e., two real antennas are copied and extended to form four antennas, such that the base stations 200, 202 and 204 all use four antennas to transmit signal for the user equipment 416. The indices of two clonal antennas of the base station 204 are "Mapped to No. 3-4 antennas". The indices are known at the receive-transmit sides and thus the user equipment 416 does not need to feed back the virtual antenna indices. Therefore, according to the indices, channel element values of two real antennas of the base station 204 are sequentially copied to channel element positions corresponding to No. 3-4 antennas, resulting in $$H_{204} = \begin{bmatrix} h_{11}^{(204)} & h_{12}^{(204)} & h_{11}^{(204)} & h_{12}^{(204)} \\ h_{21}^{(204)} & h_{22}^{(204)} & h_{21}^{(204)} & h_{22}^{(204)} \end{bmatrix}.$$

Example (b2) of the embodiment scenario 1: in FIG. 8, the base station 204 has fewer antennas and two clonal antennas are added to it, i.e., two real antennas are copied and extended to form four antennas, such that the base stations 200, 202 and 204 all use four antennas to transmit signal for the user equipment 416. The indices of two clonal antennas of the base station 204 are that the first clonal antenna is mapped to the second antenna and the second clonal antenna is mapped to the third antenna. Therefore, according to the indices, channel element values of two real antennas of the base station 204 are sequentially copied to channel element positions corresponding to No. 2-3 antennas, resulting in $$H_{204} = \begin{bmatrix} h_{11}^{(204)} & h_{11}^{(204)} & h_{12}^{(204)} & h_{12}^{(204)} \\ h_{21}^{(204)} & h_{21}^{(204)} & h_{22}^{(204)} & h_{22}^{(204)} \end{bmatrix}.$$

Example (a1) of the embodiment scenario 2: in FIG. 9, the base stations 202 and 204 have fewer antennas and four and six dummy antennas, i.e., virtual antennas with null power, are added to these two base stations respectively such that the base stations 200, 202 and 204 all use eight antennas to transmit signal for the user equipment 416. The dummy antenna indices of the base station 202 are "mapped to No. 5-8 antennas" and the dummy antenna indices of the base station 204 are "mapped to No. 3-8 antennas". Therefore, according to the indices, the channel elements corresponding to the No.

5-8 antennas of the base station 202 are set to 0 and the power correction is performed for channel elements at other positions, resulting in $$H_{202} = \begin{bmatrix} \sqrt{2}\,h_{11}^{(202)} & \sqrt{2}\,h_{12}^{(202)} & \sqrt{2}\,h_{13}^{(202)} & \sqrt{2}\,h_{14}^{(202)} & 0 & 0 & 0 & 0 \\ \sqrt{2}\,h_{21}^{(202)} & \sqrt{2}\,h_{22}^{(202)} & \sqrt{2}\,h_{23}^{(202)} & \sqrt{2}\,h_{24}^{(202)} & 0 & 0 & 0 & 0 \\ \sqrt{2}\,h_{31}^{(202)} & \sqrt{2}\,h_{32}^{(202)} & \sqrt{2}\,h_{33}^{(202)} & \sqrt{2}\,h_{34}^{(202)} & 0 & 0 & 0 & 0 \\ \sqrt{2}\,h_{41}^{(202)} & \sqrt{2}\,h_{42}^{(202)} & \sqrt{2}\,h_{43}^{(202)} & \sqrt{2}\,h_{44}^{(202)} & 0 & 0 & 0 & 0 \end{bmatrix} \cdot \sqrt{2}$$

is a power correction factor used to cause the dummy antenna introduction not to change the total power of the base station 202. In addition, the channel elements corresponding to the No. 3-8 antennas of the base station 204 are set to 0 and the power correction is performed for channel elements at other positions, resulting in $$H_{204} = \begin{bmatrix} \sqrt{2}\,h_{11}^{(202)} & \sqrt{2}\,h_{12}^{(202)} & 0 & 0 & 0 & 0 & 0 & 0 \\ \sqrt{2}\,h_{21}^{(202)} & \sqrt{2}\,h_{22}^{(202)} & 0 & 0 & 0 & 0 & 0 & 0 \\ \sqrt{2}\,h_{31}^{(202)} & \sqrt{2}\,h_{32}^{(202)} & 0 & 0 & 0 & 0 & 0 & 0 \\ \sqrt{2}\,h_{41}^{(202)} & \sqrt{2}\,h_{42}^{(202)} & 0 & 0 & 0 & 0 & 0 & 0 \end{bmatrix} \cdot 2\sqrt{2}$$

is a power correction factor used to cause the dummy antenna introduction not to change the total power of the base station 204.

Example (a2) of the embodiment scenario 2: in FIG. 9, the base stations 202 and 204 have fewer antennas and four and six dummy antennas, i.e., virtual antennas with null power, are added to these two base stations respectively such that the base stations 200, 202 and 204 all use eight antennas to transmit signal for the user equipment 416. The dummy antenna indices of the base station 202 are that four dummy antennas are mapped to No. 2, 3, 6 and 8 antennas respectively, and the dummy antenna indices of the base station 204 are that six dummy antennas are mapped to No. 2, 3, 4, 6, 7 and 8 antennas. Therefore, according to the indices, the channel elements corresponding to the No. 2, 3, 6 and 8 antennas of the base station 202 are set to 0 and the power correction is performed for channel elements at other positions, resulting in $$H_{202} = \begin{bmatrix} \sqrt{2}\,h_{11}^{(202)} & 0 & 0 & \sqrt{2}\,h_{12}^{(202)} & \sqrt{2}\,h_{13}^{(202)} & 0 & \sqrt{2}\,h_{14}^{(202)} & 0 \\ \sqrt{2}\,h_{21}^{(202)} & 0 & 0 & \sqrt{2}\,h_{22}^{(202)} & \sqrt{2}\,h_{23}^{(202)} & 0 & \sqrt{2}\,h_{24}^{(202)} & 0 \\ \sqrt{2}\,h_{31}^{(202)} & 0 & 0 & \sqrt{2}\,h_{32}^{(202)} & \sqrt{2}\,h_{33}^{(202)} & 0 & \sqrt{2}\,h_{34}^{(202)} & 0 \\ \sqrt{2}\,h_{41}^{(202)} & 0 & 0 & \sqrt{2}\,h_{42}^{(202)} & \sqrt{2}\,h_{43}^{(202)} & 0 & \sqrt{2}\,h_{44}^{(202)} & 0 \end{bmatrix} \cdot \sqrt{2}$$

is a power correction factor used to cause the dummy antenna introduction not to change the total power of the base station 202. In addition, the channel elements corresponding to the No. 2, 3, 4, 6, 7 and 8 antennas of the base station 204 are set to 0 and the power correction is performed for channel elements at other positions, resulting in $$H_{204} = \begin{bmatrix} 2\sqrt{2}\,h_{11}^{(202)} & 0 & 0 & 0 & 2\sqrt{2}\,h_{12}^{(202)} & 0 & 0 & 0 \\ 2\sqrt{2}\,h_{21}^{(202)} & 0 & 0 & 0 & 2\sqrt{2}\,h_{22}^{(202)} & 0 & 0 & 0 \\ 2\sqrt{2}\,h_{31}^{(202)} & 0 & 0 & 0 & 2\sqrt{2}\,h_{32}^{(202)} & 0 & 0 & 0 \\ 2\sqrt{2}\,h_{41}^{(202)} & 0 & 0 & 0 & 2\sqrt{2}\,h_{42}^{(202)} & 0 & 0 & 0 \end{bmatrix} \cdot 2\sqrt{2}$$

is a power correction factor used to cause the dummy antenna introduction not to change the total power of the base station 204.

Example (b1) of the embodiment scenario 2: in FIG. 10, the base stations 202 and 204 have fewer antennas and four and six clonal antennas are added to these two base stations respectively, i.e., real antennas are sequentially copied and extended, such that the base stations 200, 202 and 204 all use eight antennas to transmit signal for the user equipment 416. The clonal antenna indices of the base station 202 are that four clonal antennas are mapped to No. 5-8 antennas and the clonal antenna indices of the base station 204 are that six clonal antennas are mapped to No. 3-8 antennas. Therefore, according to the indices, channel element values of four real antennas of the base station 202 are sequentially copied to channel element positions corresponding to No. 5-8 antennas, resulting in $$H_{202} = \begin{bmatrix} h_{11}^{(202)} & h_{12}^{(202)} & h_{13}^{(202)} & h_{14}^{(202)} & h_{11}^{(202)} & h_{12}^{(202)} & h_{13}^{(202)} & h_{14}^{(202)} \\ h_{21}^{(202)} & h_{22}^{(202)} & h_{23}^{(202)} & h_{24}^{(202)} & h_{21}^{(202)} & h_{22}^{(202)} & h_{23}^{(202)} & h_{24}^{(202)} \\ h_{31}^{(202)} & h_{32}^{(202)} & h_{33}^{(202)} & h_{34}^{(202)} & h_{31}^{(202)} & h_{32}^{(202)} & h_{33}^{(202)} & h_{34}^{(202)} \\ h_{41}^{(202)} & h_{42}^{(202)} & h_{43}^{(202)} & h_{44}^{(202)} & h_{41}^{(202)} & h_{42}^{(202)} & h_{43}^{(202)} & h_{44}^{(202)} \end{bmatrix}.$$

In addition, channel element values of two real antennas of the base station 204 are sequentially copied to channel element positions corresponding to No. 3-8 antennas, resulting in $$H_{204} = \begin{bmatrix} h_{11}^{(202)} & h_{12}^{(202)} & h_{11}^{(202)} & h_{12}^{(202)} & h_{11}^{(202)} & h_{12}^{(202)} & h_{11}^{(202)} & h_{12}^{(202)} \\ h_{21}^{(202)} & h_{22}^{(202)} & h_{21}^{(202)} & h_{22}^{(202)} & h_{21}^{(202)} & h_{22}^{(202)} & h_{21}^{(202)} & h_{22}^{(202)} \\ h_{31}^{(202)} & h_{32}^{(202)} & h_{31}^{(202)} & h_{32}^{(202)} & h_{31}^{(202)} & h_{32}^{(202)} & h_{31}^{(202)} & h_{32}^{(202)} \\ h_{41}^{(202)} & h_{42}^{(202)} & h_{41}^{(202)} & h_{42}^{(202)} & h_{41}^{(202)} & h_{42}^{(202)} & h_{41}^{(202)} & h_{42}^{(202)} \end{bmatrix}.$$

Example (b2) of the embodiment scenario 2: in FIG. 10, the base stations 202 and 204 have fewer antennas and four and six clonal antennas are added to them respectively, i.e., real antennas are sequentially copied and extended, such that the base stations 200, 202 and 204 all use eight antennas to transmit signal for the user equipment 416. The clonal antenna indices of the base station 202 are that four clonal antennas are mapped to No. 2, 3, 6 and 8 antennas and the clonal antenna indices of the base station 204 are that six clonal antennas are mapped to No. 2, 3, 4, 6, 7 and 8 antennas. Therefore, according to the indices, channel element values of four real antennas of the base station 202 are sequentially copied to channel element positions corresponding to No. 2, 3, 6 and 8 antennas, resulting in $$H_{202} = \begin{bmatrix} h_{11}^{(202)} & h_{11}^{(202)} & h_{12}^{(202)} & h_{12}^{(202)} & h_{13}^{(202)} & h_{13}^{(202)} & h_{14}^{(202)} & h_{14}^{(202)} \\ h_{21}^{(202)} & h_{21}^{(202)} & h_{22}^{(202)} & h_{22}^{(202)} & h_{23}^{(202)} & h_{23}^{(202)} & h_{24}^{(202)} & h_{24}^{(202)} \\ h_{31}^{(202)} & h_{31}^{(202)} & h_{32}^{(202)} & h_{32}^{(202)} & h_{33}^{(202)} & h_{33}^{(202)} & h_{34}^{(202)} & h_{34}^{(202)} \\ h_{41}^{(202)} & h_{41}^{(202)} & h_{42}^{(202)} & h_{42}^{(202)} & h_{43}^{(202)} & h_{43}^{(202)} & h_{44}^{(202)} & h_{44}^{(202)} \end{bmatrix}.$$

In addition, channel element values of two real antennas of the base station 204 are sequentially copied to channel element positions corresponding to No. 2, 3, 4, 6, 7 and 8 antennas, resulting in $$H_{204} = \begin{bmatrix} h_{11}^{(202)} & h_{11}^{(202)} & h_{12}^{(202)} & h_{11}^{(202)} & h_{12}^{(202)} & h_{12}^{(202)} & h_{11}^{(202)} & h_{12}^{(202)} \\ h_{21}^{(202)} & h_{21}^{(202)} & h_{22}^{(202)} & h_{21}^{(202)} & h_{22}^{(202)} & h_{22}^{(202)} & h_{21}^{(202)} & h_{22}^{(202)} \\ h_{31}^{(202)} & h_{31}^{(202)} & h_{32}^{(202)} & h_{31}^{(202)} & h_{32}^{(202)} & h_{32}^{(202)} & h_{31}^{(202)} & h_{32}^{(202)} \\ h_{41}^{(202)} & h_{41}^{(202)} & h_{42}^{(202)} & h_{41}^{(202)} & h_{42}^{(202)} & h_{42}^{(202)} & h_{41}^{(202)} & h_{42}^{(202)} \end{bmatrix}.$$

It is to be noted that the above examples are only used to describe implementations of channel reconstruction for the multi-antenna-multi-base-station system according to the present invention, and the channel reconstruction according to the present invention is not limited to the explained form in the examples.

Step 520: the multi-antenna-multi-base-station system performs transmission pre-processing.

Each base station needs to generate a transmission pre-processing scheme for the system with added virtual antennas.

In the present embodiment, four application examples are described.

Example (a) of the embodiment scenario 1: the user equipment 416 is configured with two receive antennas, and its serving base station is base station 202 and cooperative base stations are base stations 200 and 204. The base stations 200 and 202 both use four transmit antennas and the base station 204 uses two transmit antennas. In this example, the base station 204 has fewer antennas and two dummy antennas, i.e., two virtual antennas with null power, are added to the base station 204 such that the base stations 200, 202 and 204 all use four antennas to transmit signal for the user equipment 416. Therefore, the base station 204 needs to pre-store a precoding codebook for a group of four antennas if adopting a precoding scheme of the LTE system to transmit data.

Example (b) of the embodiment scenario 1: the user equipment 416 is configured with two receive antennas, and its serving base station is base station 202 and cooperative base stations are base stations 200 and 204. The base stations 200 and 202 both use four transmit antennas and the base station 204 uses two transmit antennas. In this example, the base station 204 has fewer antennas and two clonal antennas are added, i.e., two real antennas are sequentially copied and extended to form four antennas, such that the base stations 200, 202 and 204 all use four antennas to transmit signal for the user equipment 416. Therefore, the base station 204 needs to pre-store a precoding codebook for a group of four antennas if adopting a precoding scheme of the LTE system to transmit data.

Example (a) of the embodiment scenario 2: the user equipment 416 is configured with four receive antennas, and its serving base station is base station 202 and cooperative base stations are base stations 200 and 204. The base station 200 uses eight transmit antennas, the base station 202 uses four transmit antennas and the base station 204 uses two transmit antennas. In this example, the base stations 202 and 204 have fewer antennas and four and six dummy antennas, i.e., virtual antennas with null power, are added to these two base stations respectively such that the base stations 200, 202 and 204 all use eight antennas to transmit signal for the user equipment 416. Therefore, the base stations 202 and 204 need to pre-store a precoding codebook for a group of eight antennas if adopting a precoding scheme of the LTE system to transmit data.

Example (b) of the embodiment scenario 2: the user equipment 416 is configured with four receive antennas, and its serving base station is base station 202 and cooperative base stations are base stations 200 and 204. The base station 200 uses eight transmit antennas, the base station 202 uses four transmit antennas and the base station 204 uses two transmit antennas. In this example, the base stations 202 and 204 have fewer antennas and four and six clonal antennas are added to these two base stations respectively, i.e., real antennas are sequentially copied and extended to form eight antennas, such that the base stations 200, 202 and 204 all use eight antennas to transmit signal for the user equipment 416. Therefore, the base stations 202 and 204 need to pre-store a precoding codebook for a group of eight antennas if adopting a precoding scheme of the LTE system to transmit data.

It is to be noted that the present embodiment does not intend to limit the transmission pre-processing of the multi-antenna-multi-base-station system, for example, any one or more of seven downlink data transmission schemes in the LTE system may be adopted.

Hardware Implementation

Figure 14:
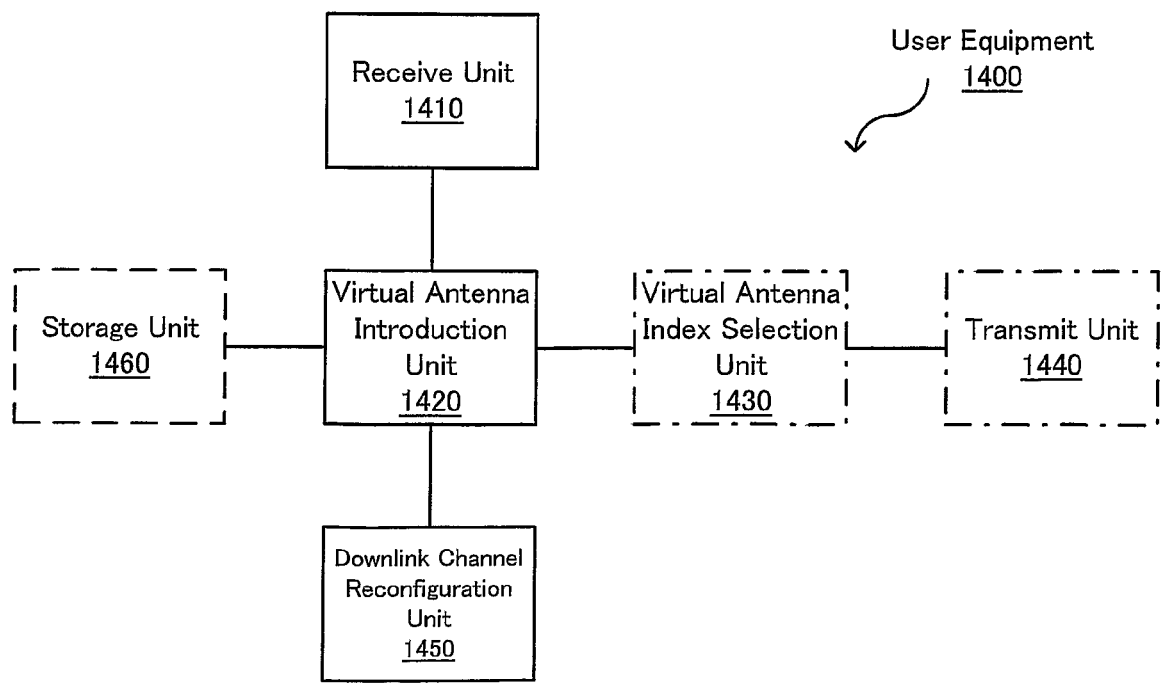
FIG. 14 is a block diagram illustrating a user equipment 1400 according to an embodiment of the present invention.

FIG. 14 is a block diagram illustrating a user equipment 1400 according to an embodiment of the present invention. The user equipment 1400 shown in FIG. 14 may correspond to the above user equipment 416.

As shown in FIG. 14, the user equipment 1400 according to the present invention includes a receive unit 1410 for receiving, from the base station, configuration information of the user equipment 1400, which includes at least identification information of respective cooperative base stations (e.g., cell identifier of the cooperative base station) and respective numbers of antennas configured by the serving base station and the cooperative base station for the user equipment; a virtual antenna introduction unit 1420 for introducing virtual antennas to the base station with fewer antennas if the serving base station and cooperative base station configure different number of antennas for the user equipment; and a downlink channel reconstruction unit 1450 for reconstructing downlink channels between the base stations (the serving base station and respective cooperative base stations) and the user equipment 1400 and forming the downlink channels of antennas in which the serving base station and cooperative base station configure consistent number of antennas for the user equipment 1400.

According to one scheme of the present invention, the virtual antenna introduction unit 1420 adds dummy antennas as the virtual antennas to the base station with less number of antennas, i.e., adding dummy antennas with null power to the base station with less number of antennas, such that the serving base station and respective cooperative base stations configure consistent number of antennas for the user equipment. In this scheme, the downlink channel reconstruction unit 1450 sets channel elements corresponding to the dummy antennas to 0 according to the indices of the dummy antennas and performs power correction for channel elements at other positions so that the introduction of the dummy antennas will not be change the total power of the base station.

Alternatively, according to another scheme of the present invention, the virtual antenna introduction unit 1420 adds clonal antennas as the virtual antennas to the base station with less number of antennas, i.e., copying and extending real antennas of the base station with less number of antennas (which could be performed according to sequential number of the antennas), such that the serving base station and respective cooperative base stations configure consistent number of antennas for the user equipment. In this scheme, the downlink channel reconstruction unit 1450 copies channel element values corresponding to the real antennas to channel element positions corresponding to the clonal antennas according to the indices of the clonal antennas.

In FIG. 14, the user equipment 1400 further includes a virtual antenna index selection unit 1430 (shown as a dash-dotted block) for selecting indices of the introduced virtual antennas and a transmit unit 1440 (shown as a dashdotted block) for feeding back the selected virtual antenna indices to the serving base station. Furthermore, the transmit unit 1440 may feed back the selected virtual antenna indices to respective cooperative base stations.

Moreover, the user equipment 1400 in FIG. 14 further includes a storage unit 1460 for saving a mapping table related to the indices of the introduced virtual antennas (a mapping table predetermined by the receive-transmit sides (between the user equipment 1400 and the serving base station 202, and between the user equipment 1400 and the cooperative base station 200 and/or 204)). In such case, the virtual antenna introduction unit 1420 introduces the virtual antennas to the base station with less number of antennas according to the mapping table.

It is to be noted that when the user equipment 1400 includes the storage unit 1460 and the virtual antenna introduction unit 1420 introduces the virtual antennas to the base station with less number of antennas according to the mapping table saved in the storage unit 1460, it is feasible to not feed back any information to the serving base station and the cooperative base station. Therefore, the virtual antenna index selection unit 1430 and the transmit unit 1440 shown as dashdotted blocks may be omitted. Similarly, when the user equipment includes the virtual antenna index selection unit 1430 and the transmit unit 1440, the storage unit 1460 shown as a dashdotted block may be omitted.

Figure 15:
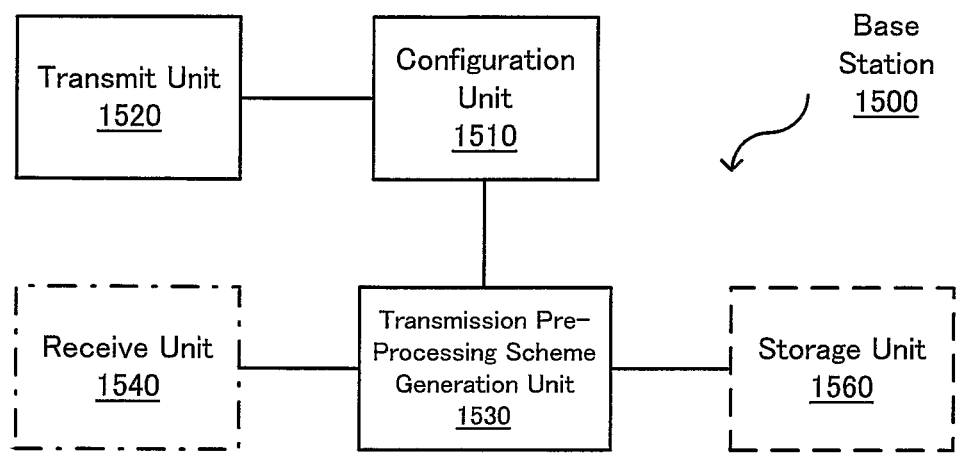
FIG. 15 is a block diagram illustrating a base station 1500 according to an embodiment of the present invention.

FIG. 15 is a block diagram illustrating a base station 1500 according to an embodiment of the present invention. The base station 1500 shown in FIG. 15 may correspond to the above serving base station 202.

As shown in FIG. 15, the base station 1500 of the present invention 1500 includes a configuration unit 1510 for configuring the user equipment 1400 and generating the configuration information for the user equipment 1400, which includes at least identification information of respective cooperative base stations (e.g., cell identifier of the cooperative base station) and respective numbers of antennas configured by the base station 1500 and respective cooperative base stations for the user equipment; a transmit unit 1520 for transmitting the configuration information to the user equipment 1400 and a transmission pre-processing scheme generating unit 1530 for generating a transmission pre-processing scheme according to an introduced virtual antenna configuration and transmitting signal to the user equipment 1400.

In FIG. 15, the base station 1500 further includes a receive unit 1540 (represented as a dashdotted block) for receiving the indices of the introduced virtual antennas from the user equipment 1400 (transmit unit 1440).

Moreover, the base station 1500 in FIG. 15 further includes a storage unit 1560 (represented as a broken line block) for saving a mapping table (which is predetermined by the user equipment 1400 and the serving base station 1500) related to the indices of the introduced virtual antennas.

Similar to FIG. 14, it is also to be noted that when the base station 1500 in FIG. 15 includes the storage unit 1560, the receive unit 1540 represented as a dashdotted block may be omitted. Similarly, when the base station includes the receive unit 1540, the storage unit 1560 represented as a broken line block may be omitted.

The transmission pre-processing scheme generating unit 1530 obtains a precoding codebook matched to the number of antennas according to the introduced virtual antenna configuration.

Figure 16:
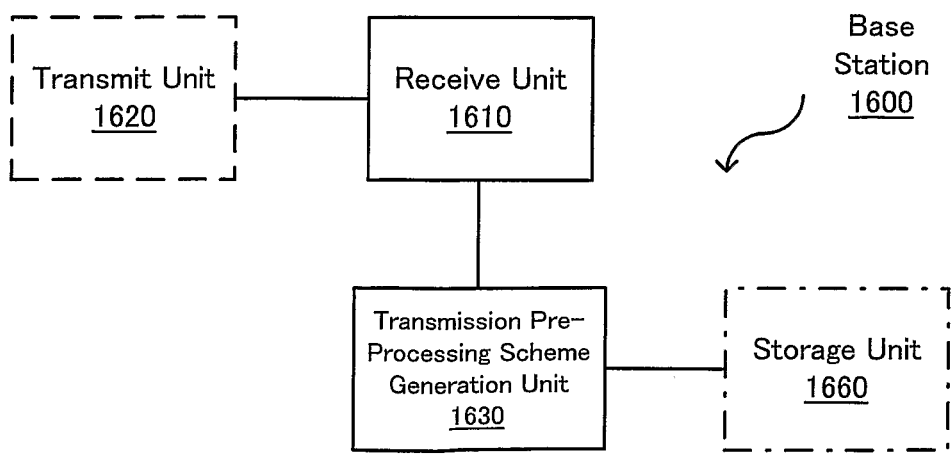
FIG. 16 is a block diagram illustrating a base station 1600 according to an embodiment of the present invention.

FIG. 16 is a block diagram illustrating a base station 1600 according to an embodiment of the present invention. The base station shown in FIG. 16 may correspond to at least one of above cooperative base stations 200 and 204.

As shown in FIG. 16, the base station 1600 according to the present invention includes a receive unit 1610 for receiving, from a serving base station 1500 in the cooperative communication that the base station 1600 participates in, configuration information configured by the serving base station 1500 for the use equipment 1400, which includes at least identification information of respective cooperative base stations (e.g., cell identifier of the cooperative base station) and number of antennas configured by the base station 1500 and respective cooperative base stations (including the base station 1600) for the user equipment; and a transmission pre-processing scheme generating unit 1630 for generating a transmission pre-processing scheme according to the introduced virtual antenna configuration (indices of the virtual antennas) and transmitting signal to the user equipment 1400.

The base station 1600 in FIG. 16 further includes a transmit unit 1620 (represented as a broken line block) for transmitting the configuration information to the user equipment 1400. On the other hand, the base station 1600 may also not transmit the configuration information to the user equipment 1400 and the processing is realized by the serving base station 1500. In such case the transmit unit 1620 represented by the broken line block may be omitted.

According to one scheme of the present invention, the receive unit 1610 may be used to receive the indices of the introduced virtual antennas from the user equipment 1400 (transmit unit 1440).

Alternatively, according to another scheme of the present invention, the receive unit 1610 may be used to receive the indices of the introduced virtual antennas from the serving base station 1500.

Alternatively, according to another scheme of the present invention, the base station 1600 further includes a storage unit 1660 (represented as a dashdotted block) for saving a mapping table (which is predetermined by the user equipment 1400 and the base station 1600) related to the indices of the introduced virtual antennas.

The base station 1600 as the cooperative base station may obtain the indices of the introduced virtual antennas through any one of the following three methods according to the embodied implementations: (1) receiving from the user equipment 1400 through a receive unit 1610; (2) a notification from the serving base station 1500; and (3) obtaining from the storage unit 1660. When adopting the first two methods, the storage unit 1660 represented as a dashdotted block may be omitted.

The transmission pre-processing scheme generating unit 1630 obtains a precoding codebook matched to the number of antennas according to the introduced virtual antenna configuration.

It is to be noted that in the above descriptions the technical solution of the present invention is explained in a way of schematic examples, however the present invention is not limited to the above steps and units. In some circumstances, the steps and units may be adjusted and accepted or rejected based on the demands. Therefore, some steps and units are not necessary for implementing the invention idea of the present invention. For example, the transmit unit 1620 in the cooperative base station 1600 may be omitted according to requirements and the configuration information is notified to the user equipment 1400 only through the serving base station 1500. Therefore, the necessary technical features of the present invention are only restricted by the lowest requirements for implementing the invention idea of the present invention and are not restricted by the above detailed embodiments.

It is to be understood that the claims are not limited to the precise configuration and components illustrated above. Various modifications, changes and variations may be made in the arrangement, operation and details of the systems, methods, and apparatus described herein without departing from the scope of the claims.

The invention claimed is:

1. A base station, comprising:
    a configuration unit configuring a user equipment and generating configuration information for said user equipment, said configuration information including at least identification information of respective cooperative base stations and respective numbers of antennas configured by said base station and respective cooperative base stations for said user equipment;
    a transmit unit notifying said configuration information to said user equipment; and
    a transmission pre-processing scheme generating unit generating a transmission pre-processing scheme according to an introduced virtual antenna configuration and transmitting signal to said user equipment.

2. The base station of claim 1, wherein said identification information of respective cooperative base stations is cell identifiers (cell IDs) of respective cooperative base stations.

3. The base station of claim 1, further comprising:
    a receive unit receiving an index of an introduced virtual antenna from said user equipment.

4. The base station of claim 1, further comprising:
    a storage unit saving a mapping table related to an index of an introduced virtual antenna.

5. The base station of claim 1, wherein said transmission pre-processing scheme generating unit obtains a precoding codebook matched to said number of antennas according to said introduced virtual antenna configuration.

6. The base station of claim 1, wherein said base station is applicable to a multi-antenna-multi-base-station system and used as a serving base station.

7. A base station, comprising:
    a receive unit receiving, from a serving base station in a cooperative communication that said base station participated in, configuration information configured by said serving base station for a user equipment, said configuration information including at least identification information of respective cooperative base stations and respective numbers of antennas configured by said serving base station and said cooperative base stations for said user equipment; and
    a transmission pre-processing scheme generating unit generating a transmission pre-processing scheme according to an introduced virtual antenna configuration and transmitting signal to said user equipment.

8. The base station of claim 7, further comprising:
    a transmit unit notifying said configuration information to said user equipment.

9. The base station of claim 7, wherein said identification information of respective cooperative base stations is cell identifiers (cell IDs) of respective cooperative base stations.

10. The base station of claim 7, wherein said receive unit further receives an introduced virtual antenna configuration, i.e., indices of said virtual antennas, from said user equipment.

11. The base station of claim 7, further comprising:
    a storage unit saving a mapping table related to an introduced virtual antenna configuration.

12. The base station of claim 7, wherein said transmission pre-processing scheme generating unit obtains a precoding codebook matched to said number of antennas according to said introduced virtual antenna configuration.

13. The base station of claim 7, wherein said base station is applicable to a multi-antenna-multi-base-station system and used as a cooperative base station.

* * * * *